(12) United States Patent
Watanabe et al.

(10) Patent No.: US 12,001,476 B2
(45) Date of Patent: Jun. 4, 2024

(54) BAGGAGE MANAGEMENT SYSTEM AND SERVER FOR USE IN THE SYSTEM

(71) Applicant: DENSO WAVE INCORPORATED, Aichi-pref. (JP)

(72) Inventors: Atsushi Watanabe, Chita-gun (JP); Kazuo Mizuno, Chita-gun (JP); Naoki Ukai, Chita-gun (JP); Takayoshi Kamiya, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 460 days.

(21) Appl. No.: 17/281,143

(22) PCT Filed: Sep. 27, 2019

(86) PCT No.: PCT/JP2019/038183
§ 371 (c)(1),
(2) Date: Mar. 29, 2021

(87) PCT Pub. No.: WO2020/067433
PCT Pub. Date: Apr. 2, 2020

(65) Prior Publication Data
US 2021/0342966 A1    Nov. 4, 2021

(30) Foreign Application Priority Data

Sep. 28, 2018  (JP) ................................. 2018-183853
Sep. 10, 2019  (JP) ................................. 2019-164647

(51) Int. Cl.
*G06F 16/58*  (2019.01)
*G06F 3/14*  (2006.01)
(Continued)

(52) U.S. Cl.
CPC ............ *G06F 16/5866* (2019.01); *G06F 3/14* (2013.01); *G06K 7/10297* (2013.01);
(Continued)

(58) Field of Classification Search
CPC .. G06Q 50/28; G06Q 10/06315; G06Q 10/08; G06Q 10/0833; G06Q 30/018;
(Continued)

(56) References Cited

U.S. PATENT DOCUMENTS

2016/0014382 A1   1/2016  Maruta
2018/0111698 A1   4/2018  Podnar et al.

FOREIGN PATENT DOCUMENTS

JP   2002-274647 A   9/2002
JP   2003-146438 A   5/2003
(Continued)

OTHER PUBLICATIONS

"Traceable Air Baggage Handling System Based on RFID Tags in the Airport" Published by School of Computer Science and Engineering, Beijing University of Aeronautics and Astronautics, China (Year: 2008).*

(Continued)

*Primary Examiner* — Zeina Elchanti
(74) *Attorney, Agent, or Firm* — Oliff PLC

(57) ABSTRACT

An airline baggage management system includes a boarding reception device; a loading reception device; and a server. The boarding reception device outputs a baggage tag with an RF tag in which tag information is recorded, the tag information including at least one of a user ID, a boarding pass ID, and a baggage ID. The loading reception device includes: a loading reader unit that performs wireless communication with the RF tag of the baggage tag attached to the baggage has arrived at the loading position to read the tag recorded in the RF tag; an information generating unit generates loading position-related information, which is related to a position in the scheduled boarding plane at which the baggage whose tag information has been read by the loading reader unit is to be loaded; and a loading (Continued)

transmission unit transmits the tag information and the loading position-related information to the server.

2 Claims, 14 Drawing Sheets

(51) Int. Cl.
| | |
|---|---|
| G06K 7/10 | (2006.01) |
| G06K 19/07 | (2006.01) |
| G06Q 10/0631 | (2023.01) |
| G06Q 10/08 | (2023.01) |
| G06Q 10/0833 | (2023.01) |
| G06Q 30/018 | (2023.01) |
| G06V 20/52 | (2022.01) |
| G06V 40/16 | (2022.01) |
| H04N 5/38 | (2006.01) |
| H04N 5/76 | (2006.01) |
| H04N 7/18 | (2006.01) |

(52) U.S. Cl.
CPC ..... *G06K 7/10386* (2013.01); *G06K 19/0723* (2013.01); *G06Q 10/06315* (2013.01); *G06Q 10/08* (2013.01); *G06Q 10/0833* (2013.01); *G06Q 30/018* (2013.01); *G06V 20/52* (2022.01); *G06V 40/168* (2022.01); *H04N 5/38* (2013.01); *H04N 5/76* (2013.01); *H04N 7/18* (2013.01); *G06K 2007/10504* (2013.01); *G06Q 2240/00* (2013.01)

(58) Field of Classification Search
CPC ... G06Q 2240/00; G06F 16/5866; G06F 3/14; G06V 20/52; G06V 40/168; G06K 7/10297; G06K 7/10386; G06K 19/0723; G06K 2007/10504; H04N 5/38; H04N 5/76; H04N 7/18
USPC .......................................................... 705/333
See application file for complete search history.

(56) References Cited

FOREIGN PATENT DOCUMENTS

| | | | |
|---|---|---|---|
| JP | 2004-054776 A | | 2/2004 |
| JP | 2007-072781 A | | 3/2007 |
| JP | 2013-203493 A | | 10/2013 |
| JP | 2013203493 A | * | 10/2013 |
| JP | 2018-005409 A | | 1/2018 |

OTHER PUBLICATIONS

Dec. 17, 2019 International Search Report issued in International Patent Application No. PCT/JP2019/038183.

* cited by examiner

⟨ARRIVAL AIRPORT⟩

BAGGAGE MANAGEMENT SYSTEM AND SERVER FOR USE IN THE SYSTEM

CROSS-REFERENCE TO RELATED APPLICATION

This application is based on and claims the benefit of priority from earlier Japanese Patent Applications No.2018-183853 filed on Sep. 28, 2018 and No.2019-164647 filed on Sep. 10, 2019 the descriptions of which are incorporated herein by reference.

BACKGROUND

Technical Field

The techniques disclosed herein relate to a baggage management system and a server for use in the system, and more specifically, relate to an airline baggage management system whereby passengers check-in their baggage at an airport or the like, and a server for use in the system.

BACKGROUND ART

PTL 1 discloses a monitoring system for identifying an area in a passenger lobby at which a user (unboarded passenger) who has not arrived at a boarding gate is present, i.e., stays.

The monitoring system includes a reception terminal that obtains a management number for a user entering the passenger lobby; a first monitoring camera that captures a facial image of the user entering the passenger lobby; a second monitoring camera provided for a plurality of divided areas defined by dividing the passenger lobby, the second monitoring camera capturing an image of each of the divided areas, a boarding gate terminal that obtains a management number of a user at a boarding gate where the user who has entered the passenger lobby should arrive, and a management device that identifies the user who has not arrived at the boarding gate, and identifies the divided area at any of which an image of a person who is estimated to be the identified unarrived user is captured based on a feature quantity of the facial image of the user captured by the first monitoring camera and a feature quantity of the facial image of the user included in the images captured by the second monitoring camera in a plurality of divided areas. With this configuration, an administrator of the system (for example, airline staff member) can roughly estimate a position (divided area) where the person estimated as the unboarded passenger is present.

CITATION LIST

Patent Literature

[PTL: 1] JP 5851651 B

Technical Problem

The technique of PTL 1 does not describe how the baggage checked-in by the user to scheduled boarding planes is managed. If operations such as loading of the baggage of the user onto the scheduled boarding plane and unloading of the baggage of the unboarded passenger, who has not appeared at the boarding gate by the departure time of the scheduled boarding plane, from the scheduled boarding plane are not appropriately performed, delay in the departure time of the scheduled boarding plane may occur.

In a known method for managing baggage to be loaded onto the scheduled boarding plane, an operator at a loading position where baggage items are loaded onto the scheduled boarding plane may read baggage identification information (for example, the management number of the user, baggage identification information, and the like) recorded in the information codes displayed on the baggage tags attached to the baggage items one by one with an information code reader, and the baggage identification information that has been read is associated with loading position-related information, which is related to a position in the scheduled boarding plane onto which the baggage should be loaded, so that they are managed by a management terminal.

However, when such a method is adopted, the operator has to read information codes displayed on the baggage tags attached to the baggage items one by one using the information code reader during loading of the baggage. In this case, the operator has to bring the reading unit of the information code reader close to the information code. Since the baggage items arriving at the loading position are often oriented in irregular directions, a heavy burden is put on the operator in bringing the reading unit of the information code reader close to the information code. Further, during unloading of the baggage of the unboarded passenger from the scheduled boarding plane, the operator also has to read the information code displayed on the baggage tag to confirm that the baggage is the correct baggage that should be unloaded, which places a heavy burden on the operator.

Therefore, it has been desired to provide techniques for appropriately managing baggage.

The present disclosure provides techniques for appropriately managing baggage items of passengers who are about to board a vehicle such as an aircraft at a facility such as an airport, and reducing the burden on operators managing these baggage items to thereby prevent occurrence of delay in the departure time of vehicles such as scheduled boarding planes (i.e., scheduled boarding flights).

SUMMARY

There is provided, as one aspect, a baggage management system disclosed in the present specification includes:
 a boarding reception device whereby a user performs a procedure required to board a departure vehicle at a departure facility;
 a loading reception device provided at a loading position where baggage checked-in by the user is loaded onto the departure vehicle at the departure facility; and
 a server capable of communicating with the boarding reception device and the loading reception device,
 the boarding reception device including:
 a tag output unit that outputs a baggage tag provided with an RF tag in which tag information is recorded, the tag information including at least one of a user ID for identifying the user, a boarding pass ID assigned to the user and related to the departure vehicle, and a baggage ID for identifying the baggage which is checked-in by the user;
 a receiving unit that receives the baggage with the outputted baggage tag being attached thereto, and transports the received baggage to the loading position; and
 an information transmission unit that transmits user-related information including the tag information to the server,
 the server including:

a memory;
a server reception unit that receives the user-related information from the boarding reception device; and
a storage control unit that stores the user-related information received from the boarding reception device in the memory, and
the loading reception device including:
a loading reader unit that performs wireless communication with the RF tag of the baggage tag attached to the baggage that has arrived at the loading position to thereby read the tag information recorded in the RF tag;
an information generating unit that generates loading position-related information, which is related to a position in the departure vehicle at which the baggage whose tag information has been read by the loading reader unit is to be loaded; and
a loading transmission unit that transmits the tag information and the loading position-related information to the server, wherein
the server reception unit further receives the tag information and the loading position-related information from the loading reception device, and
the storage control unit further identifies the user-related information in the memory including information that matches at least one of the user ID, the boarding pass ID, and the baggage ID included in the tag information received from the loading reception device, and associates the identified user-related information with the loading position-related information received from the loading reception device and stores the associated user-related information and loading position-related information in the memory.

The above baggage management system is constructed as an airline baggage management system, for example. In this case, the departure facility is a departure airport of the user, the baggage is checked-in by the user at the departure airport to a scheduled boarding plane which is the departure vehicle, and the baggage ID is assigned to the baggage to identify the baggage.

With the above system configuration, the following advantageous effects are obtained.

According to the above configuration of the airline baggage management system, the loading reception device performs wireless communication with the RF tag of the baggage tag attached to the baggage that has arrived at the loading position to read the tag information, and transmits the tag information and the loading position-related information to the server. That is, the loading reception device can read the tag information as long as it can perform wireless communication with the RF tag attached to the baggage regardless of which direction the baggage that has arrived at the loading position is oriented. Accordingly, the burden on the operator can be reduced compared with a configuration in which an operator reads baggage information recorded in the information codes displayed on the baggage tags attached to the baggage items one by one with an information code reader. Further, the server can associate the user-related information with the loading position-related information, and store them in the memory. That is, the server can appropriately manage the loading position of baggage. Therefore, according to the above configuration, since baggage can be appropriately managed and the burden on the operator can be reduced, it is possible to prevent occurrence of delay in the departure time of the scheduled boarding plane.

An operator terminal carried by an operator working at the loading position may be further provided. The loading reception device may further include a loading writer unit that performs wireless communication with the RF tag of the baggage tag attached to the baggage that has arrived at the loading position to thereby record the loading position-related information in the RF tag. The operator terminal may include: an operator terminal display unit; an operator terminal reader unit that performs wireless communication with the RF tag of the baggage tag attached to the baggage that has been loaded on the scheduled boarding plane to thereby read the loading position-related information recorded in the RF tag; and a first display control unit that causes the operator terminal display unit to display information indicating a position of the baggage based on the read loading position-related information.

With this configuration, for example, in removal of baggage of the user (hereinafter, also referred to as a "unboarded passenger") who has not arrived at the gate (boarding gate) for boarding the scheduled boarding plane by a predetermined time, the operator can operate the operator terminal to cause the operator terminal reader to perform wireless communication with the RF tag of the baggage tag attached to the baggage of the unboarded passenger to thereby display information indicating the position of the baggage of the unboarded passenger on the operator terminal display unit. When viewing the information indicating the position of the baggage of the unboarded passenger displayed on the operator terminal display unit, the operator can easily recognize the position of the baggage of the unboarded passenger. This can reduce the burden on the operator in baggage removal operation of the baggage of the unboarded passenger. Therefore, with this configuration, it is possible to further prevent occurrence of delay in the departure time of the scheduled boarding plane.

An operator terminal carried by an operator working at the loading position may be further provided. The server may further include a baggage removal instruction transmission unit that is capable of communicating with the operator terminal, and transmits a baggage removal instruction including at least part of the user-related information and the loading position-related information associated with the user-related information to the operator terminal. The operator terminal may include: an operator terminal display unit; a baggage removal instruction reception unit that receives the baggage removal instruction from the server; and a second display control unit that causes the operator terminal display unit to display information indicating a position of the baggage based on at least part of the user-related information included in the baggage removal instruction and the loading position-related information.

With this configuration, for example, the server can transmit a baggage removal instruction including at least part of the user-related information of the unboarded passenger and loading position-related information associated with the user-related information to the operator terminal to thereby display information indicating a position of the baggage of the unboarded passenger on the operator terminal display unit of the operator terminal. When viewing the information indicating the position of the baggage displayed on the operator terminal display unit, the operator can easily recognize the position of the baggage of the unboarded passenger. This can reduce the burden on the operator in baggage removal operation of the baggage of the unboarded passenger. Therefore, with this configuration, it is possible to further prevent occurrence of delay in the departure time of the scheduled boarding plane.

The boarding reception device may further include a baggage image obtaining unit that captures an image of the baggage to obtain a baggage image. The user-related information may include the baggage image in addition to the tag information. At least part of the user-related information included in the baggage removal instruction may include the baggage image. The second display control unit may cause the operator terminal display unit to display the baggage image together with the information indicating the position of the baggage.

With this configuration, when the operator terminal receives the baggage removal instruction, the operator terminal display unit can display the baggage image together with the information indicating the position of the baggage. When viewing the operator terminal display unit, the operator can recognize the appearance of the baggage in addition to the position of the baggage to be removed (for example, baggage of the unboarded passenger). Accordingly, the operator can easily find the baggage to be removed that has been already loaded on the scheduled boarding plane. Therefore, with this configuration, it is possible to reduce the burden on the operator in baggage removal operation of the baggage of the unboarded passenger, and further prevent occurrence of delay in the departure time of the scheduled boarding plane.

A plurality of monitoring devices may be provided in the departure airport at a plurality of positions within a range between an installation position of the boarding reception device and a boarding position to the scheduled boarding plane, the plurality of monitoring devices being capable of communicating with the server. The boarding reception device may further include a user image obtaining unit that captures an image of the user to obtain a user image. The user-related information may include the user image in addition to the tag information. Each of the plurality of monitoring devices may include: an imaging unit that captures an image of a predetermined imaging range to obtain an image; and a monitoring transmission unit, which is configured to, when an image captured by the imaging unit includes a specific image, which is an image of the same person as the user displayed in the user image stored in the memory of the server, transmit a part of the user-related information including the user image, positional information indicating an installation position of the monitoring device, and time information indicating a time when the specific image is captured to the server. When the storage control unit receives a part of the user-related information, the positional information, and the time information from each of the plurality of monitoring devices, the storage control unit may associate the user-related information, the positional information, and the time information with each other, and store them in the memory.

With this configuration, the server can associate the user-related information including the user image, the positional information, and the time information with each other, and store them in the memory. When viewing the user-related information, the positional information, and the time information stored in the memory, an administrator of the server can recognize the time and position where each user has stayed among a plurality of positions within the range between the installation position of the boarding reception device and the boarding position to the scheduled boarding plane. Therefore, for example, by providing one of the plurality of monitoring devices at the boarding gate, the administrator of the server can identify the user (that is, unboarded passenger) who has not arrived at the boarding gate by a predetermined time, and also recognize the area within the range between the installation position of the boarding reception device and the boarding position to the scheduled boarding plane where the unboarded passenger has stayed. It is thus possible to identify and search for the unboarded passenger with improved efficiency, and further effectively prevent occurrence of delay in the departure time of the scheduled boarding plane.

A staff's terminal carried by a staff member in the departure airport may be further provided. The user-related information may include the user ID. The server may further include a call instruction transmission unit that is capable of communicating with the staff's terminal, and transmits a call instruction including at least the user ID and the user image from among the user-related information to the staff's terminal. The staff's terminal may include: a staff terminal display unit; a call instruction reception unit that receives the call instruction from the server; and a third display control unit that causes the staff terminal display unit to display information including the user image and the user ID based on the user ID and the user image included in the call instruction.

With this configuration, for example, the server can transmit a call instruction including at least the user ID and the user image from among the user-related information of the unboarded passenger to the staff's terminal to thereby display information including the user image and the user ID of the unboarded passenger on the staff terminal display unit of the staff's terminal. When viewing the information displayed on the staff terminal display unit, the staff member at the departure airport can recognize the face and the user ID (for example, name) of the unboarded passenger. Therefore, for example, when the server transmits a call instruction to the staff's terminal carried by a staff member who is in an area where the unboarded passenger is highly likely to stay, the staff member can recognize that the unboarded passenger is present nearby, and also recognize information (face, name, and the like) of the unboarded passenger by viewing the information displayed on the staff terminal display unit. It is thus possible to improve efficiency in searching for a desired user including an unboarded passenger, and effectively prevent occurrence of delay in the departure time of the scheduled boarding plane.

The call instruction may further include, in addition to the user ID and the user image, specific range information indicating a specific range within a range between the installation position of the boarding reception device and the boarding position to the scheduled boarding plane where the user corresponding to the user ID is highly likely to be present. The third display control unit may cause the staff terminal display unit to display information related to the specific range in addition to information including the user image and the user ID, based on the user ID, the user image, and the area information included in the call instruction.

With this configuration, information related to the specific range, in addition to information including the user image and the user ID of the unboarded passenger, can be displayed on the staff terminal display unit of the staff's terminal. Therefore, when viewing the staff terminal display unit, the staff member in the departure airport can recognize the specific range where the unboarded passenger is highly likely to be present in addition to the face and the user ID (for example, name) of the unboarded passenger. It is thus possible to improve efficiency in searching for a desired user including an unboarded passenger, and effectively prevent occurrence of delay in the departure time of the scheduled boarding plane.

A plurality of monitoring devices may be provided in the departure airport at a plurality of positions within a range between an installation position of the boarding reception device and a boarding position to the scheduled boarding plane, the plurality of monitoring devices being capable of communicating with the server. The boarding reception device may further include a feature point data obtaining unit that obtains feature point data representing feature points of the face of the user recorded in a recording medium owned by the user. The user-related information may include the feature point data in addition to the tag information. Each of the plurality of monitoring devices may include: an imaging unit that captures an image of a predetermined imaging range to obtain an image; and a monitoring transmission unit, which is configured to, when an image captured by the imaging unit includes a specific image, which is an image of the same person as the user represented by the feature point data stored in the memory of the server, transmit a part of the user-related information including the feature point data, positional information indicating an installation position of the monitoring device, and time information indicating a time when the specific image is captured to the server. When the storage control unit receives a part of the user-related information, the positional information, and the time information from each of the plurality of monitoring devices, the storage control unit may associate the user-related information, the positional information, and the time information with each other, and store them in the memory.

With this configuration, the server can associate the user-related information including the feature point data, the positional information, and the time information with each other, and store them in the memory. With this configuration as well, when viewing the user-related information, the positional information, and the time information stored in the memory, an administrator of the server can recognize the time and position where each user has stayed among a plurality of positions within the range between the installation position of the boarding reception device and the boarding position to the scheduled boarding plane. Therefore, for example, by providing one of the plurality of monitoring devices at the boarding gate, the administrator of the server can identify the user (that is, unboarded passenger) who has not arrived at the boarding gate by a predetermined time, and also recognize the area within the range between the installation position of the boarding reception device and the boarding position to the scheduled boarding plane where the unboarded passenger has stayed. It is thus possible to identify and search for the unboarded passenger with improved efficiency, and further effectively prevent occurrence of delay in the departure time of the scheduled boarding plane.

Further, according to the above configuration, the user-related information includes feature point data. In general, the data volume of the feature point data is smaller than that of the facial image itself obtained by capturing an image of the face of the user.

Therefore, the processing load of the server that stores the user-related information can be reduced. In addition, when the monitoring device determines whether or not the image captured by the imaging unit includes a specific image, which is an image of the same person as the user represented by the feature point data, the feature point data representing the feature points extracted in advance based on the face of the user can be used. In this case, the processing load of the monitoring device can be reduced compared with the case where the determination is performed by comparing the facial image of the user captured in advance with the image captured by the imaging unit. Accordingly, the determination result can be obtained quickly. As described above, according to the above configuration, the processing load of the respective devices can be reduced by the use of the feature point data. Furthermore, from the viewpoint of personal information protection as well, the personal information is desirably owned and managed by the user himself/herself. The above "recording medium" may include any medium capable of recording feature point data, for example, an identification document such as a passport or a license, a boarding pass, a ticket, and various cards owned by the user.

An unloading management device provided at an unloading position where the baggage is unloaded from the scheduled boarding plane in an arrival airport, and a user terminal carried by the user may be further provided. The user-related information may include the user ID. The user ID may include communication destination information indicating a communication destination of the user terminal. The server may be further capable of communicating with the unloading management device. The unloading management device may include: an unloading reader unit that performs wireless communication with the RF tag of the baggage tag attached to the baggage unloaded at the unloading position from the scheduled boarding plane to thereby read the tag information recorded in the RF tag; and an unloading transmission unit that transmits the tag information to the server. The server reception unit may further receive the tag information from the unloading management device. The server may further include a schedule signal transmission unit that identifies the user-related information in the memory including information that matches at least one of the user ID, the boarding pass ID, and the baggage ID included in the tag information received from the loading reception device, and transmits an arrival schedule signal to a destination defined by the communication destination information included in the identified user-related information. The user terminal may include: a notification unit; a schedule signal reception unit that receives the arrival schedule signal transmitted from the server with the communication destination information being defined as a destination; and a notification control unit that causes the notification unit to perform a notification operation for notifying a time required for the baggage to arrive near the user when receiving the arrival schedule signal.

With this configuration, as the user terminal performs the notification operation, the user can recognize the time required for his/her own baggage to arrive near the user at the arrival airport. Therefore, since the user can predict the time at which his/her own baggage arrives near the user, the user can receive his/her own baggage at an appropriate timing.

DESCRIPTION OF THE EMBODIMENTS

First Embodiment

Figure 1:
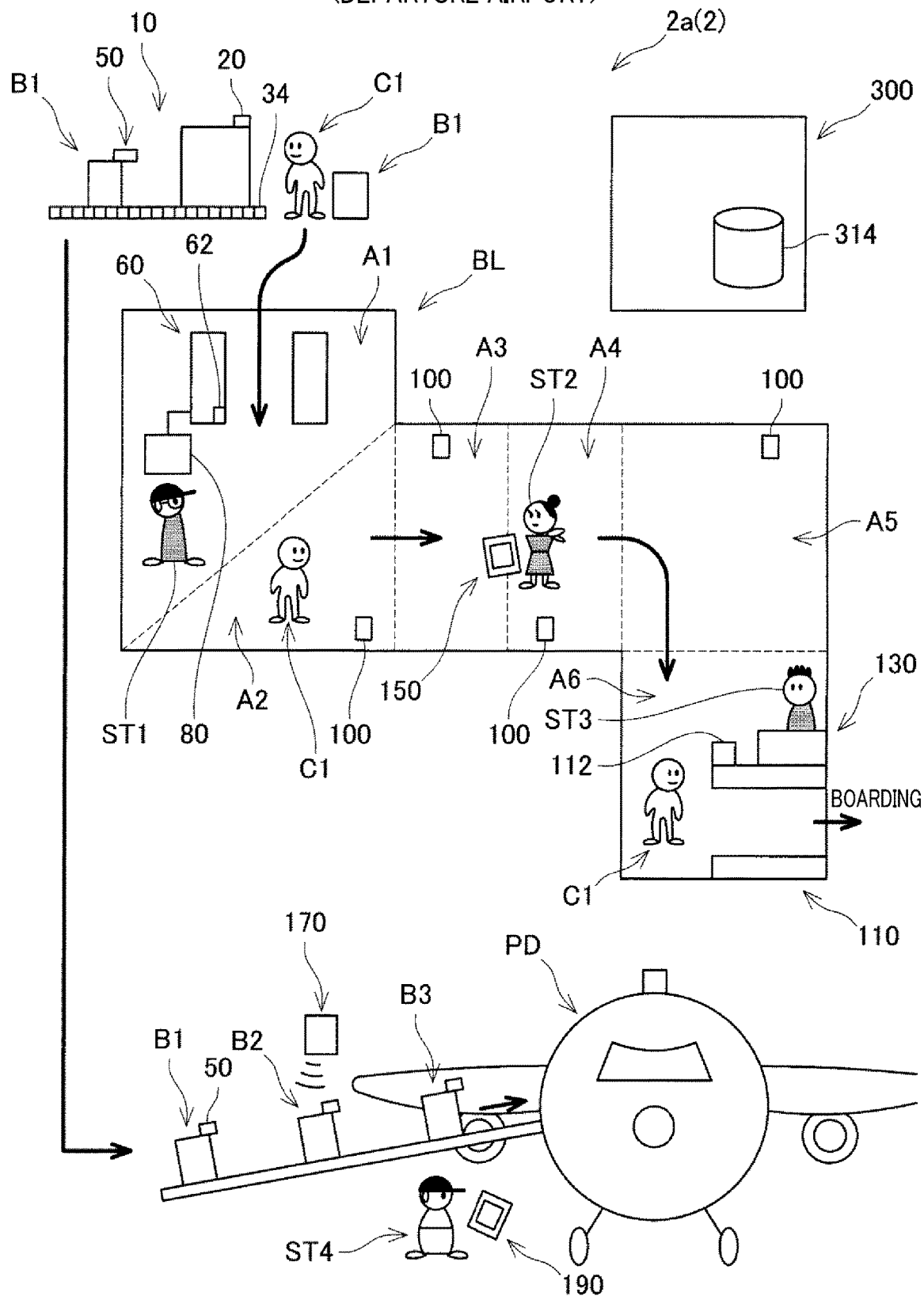
FIG. 1 is a diagram schematically illustrating a departure airport system 2a of an airport management system 2.
Figure 2:
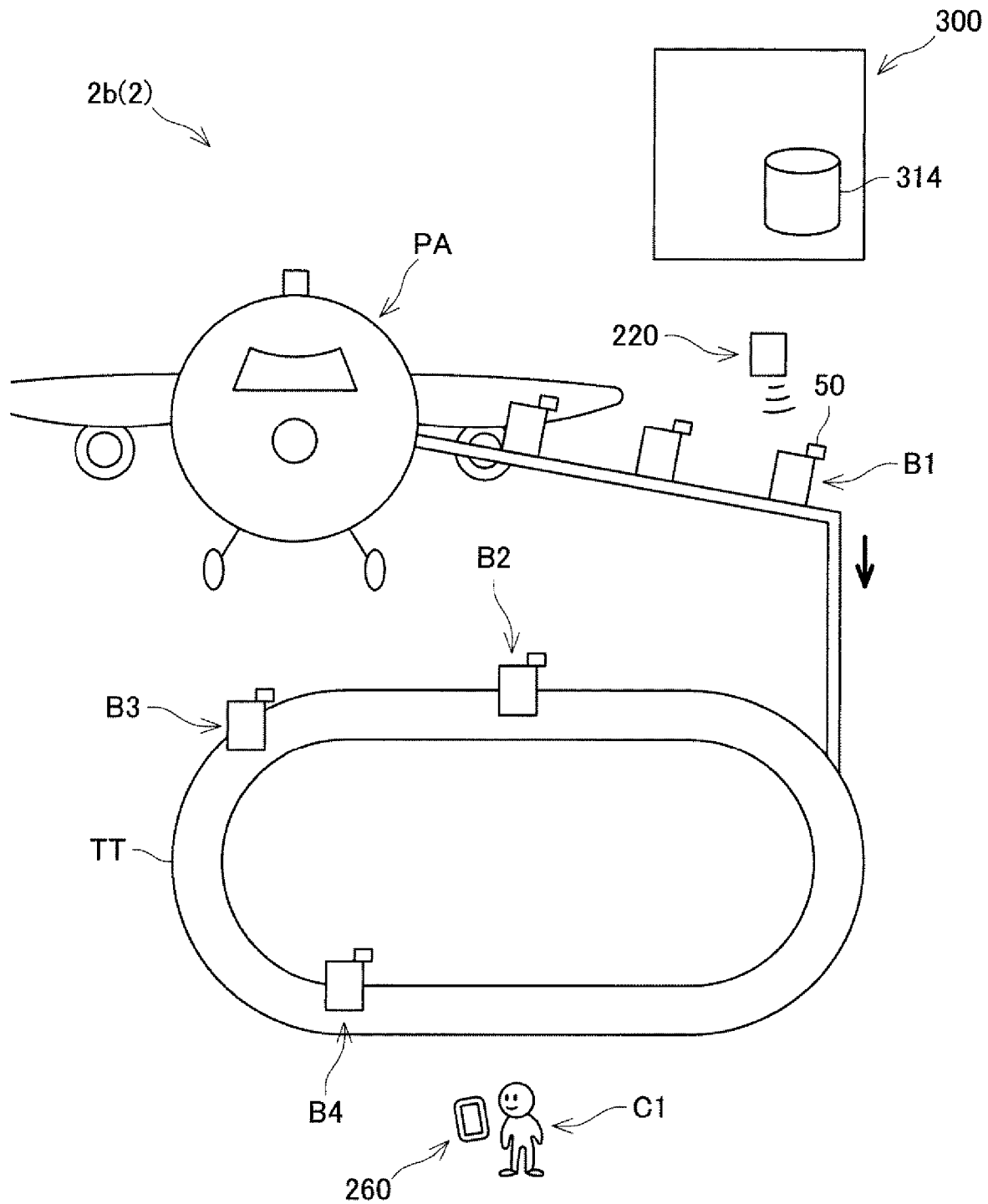
FIG. 2 is a diagram schematically illustrating an arrival airport system 2b of an airport management system 2.

Configuration of Airport Management System 2; FIG. 1 and FIG. 2

An airport management system 2 of the present embodiment shown in FIGS. 1 and 2 is a system for managing users who are about to board an aircraft (passengers about to board or scheduled boarding passengers; for example, reference numeral C1 in the figure) at a departure airport, and managing baggage items (for example, reference numerals B1 to B3 in the figure), at a departure airport and an arrival airport, that have been checked-in to a scheduled boarding plane (scheduled boarding vehicle) by the users before they boarded the aircraft. As shown in FIGS. 1 and 2, the airport management system 2 (which functions as an airline baggage management system as a baggage management system) according to the present embodiment includes a departure airport system 2a provided at a departure airport (departure facility) and an arrival airport system 2b provided at an arrival airport (arrival facility).

As shown in FIG. 1, the departure airport system 2a is a system for managing users and baggage in the departure airport. The departure airport system 2a includes a boarding reception device 10, a security gate 60, a terminal device 80, a plurality of lobby monitoring devices 100, a boarding gate 110, a terminal device 130, a staff's terminal 150, a loading reception device 170, an operator terminal 190, and a server 300.

As shown in FIG. 2, the arrival airport system 2b includes an unloading management device 220, a user terminal 260, and a server 300. The devices 10, 60, 80, 100, 110, 130, 150, 170, 190, 220, and 260 constituting the airport management system 2 shown in FIGS. 1 and 2 can communicate with the server 300 via a network 4 (see FIGS. 3 to 12). The security gate 60 and the terminal device 80 can directly communicate with each other. Further, the boarding gate 110 and the terminal device 130 can also directly communicate with each other.

As shown in FIG. 1, the boarding reception device 10 of the departure airport system 2a is provided as a computer system and is provided in a check-in area at the departure airport. The security gate 60, the terminal device 80, the plurality of lobby monitoring devices 100, the boarding gate 110, the terminal device 130, and the staff's terminal 150 are all provided in a passenger lobby BL. The passenger lobby BL is a lobby where users who have entered the security gate 60 stays until he/she enters the boarding gate 110 to board a scheduled boarding plane PD. Only the users that have completed check-in process using the boarding reception device 10 and various checks (such as ticket check and security check) at the security gate 60 can enter the passenger lobby BL. The loading reception device 170 and the operator terminal 190 are provided at a loading position where the baggage items (B1 to B3 in the figure) are loaded onto the scheduled boarding plane PD. The server 300 of the departure airport system 2a is positioned at any position in the departure airport (for example, a control tower).

As shown in FIG. 2, in the arrival airport system 2b, the unloading management device 220 is provided at an unloading position where the baggage is unloaded from an arrival plane PA arrived at the arrival airport. The user terminal 260 is carried by a user (for example, reference numeral C1 in the figure) who has deplaned the arrival plane PA and is waiting near a turntable TT, which is provided in the arrival lobby. The server 300 of the arrival airport system 2b is provided at any position in the arrival airport (for example, a control tower).

As described above, the server 300 of the departure airport system 2a (see FIG. 1) and the server 300 of the arrival airport system 2b (see FIG. 2) are provided as separate components. However, the server 300 of the departure airport system 2a and the server 300 of the arrival airport system 2b are synchronized with each other via the network 4 (see FIG. 3, for example), and functionally serves as a single server 300. Therefore, the server 300 of the departure airport system 2a and the server 300 of the arrival airport system 2b are hereinafter collectively referred to as the server 300. When the departure airport system 2a and the arrival airport system 2b have already been equipped with components other than the server, the server of the present invention can be independently constructed and incorporated into a system so that the server alone can be implemented.

Figure 3:
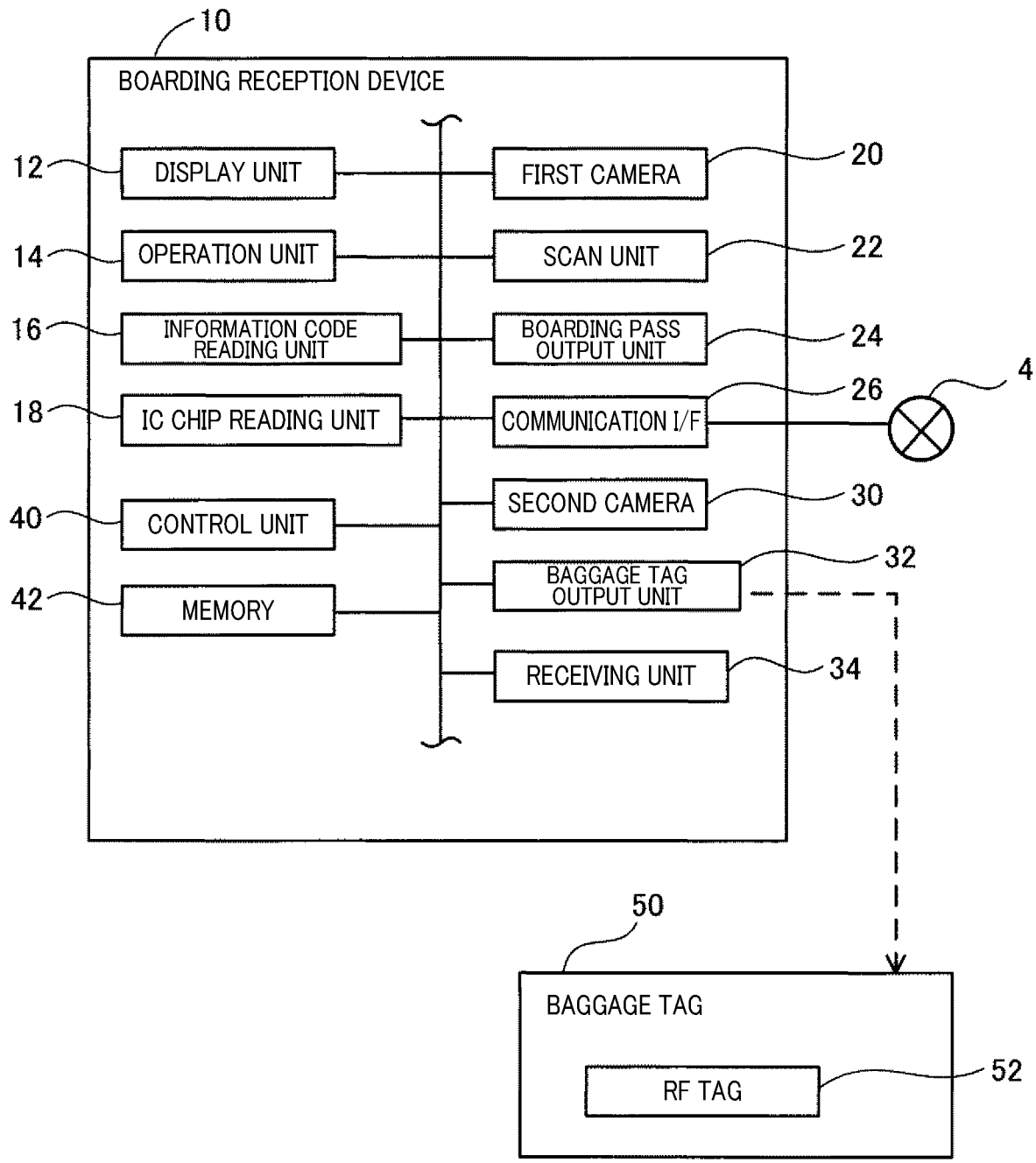
FIG. 3 is a block diagram illustrating a configuration of a boarding reception device 10.

Boarding Reception Device 10; FIG. 1 and FIG. 3

As shown in FIG. 1, the boarding reception device 10 is a device whereby the user C1 who has reserved a flight by the scheduled boarding plane PD performs the procedures for checking-in to receive a boarding pass, and checking-in the baggage B1 to the plane. In another example, the boarding reception device 10 may be composed of two devices, that is, a check-in device whereby the user C1 performs check-in process and a self bag drop (SBD) device whereby the user C1 checks-in the baggage B1.

As shown in FIG. 3, the boarding reception device 10 includes a display unit 12, an operation unit 14, an information code reading unit 16, a first camera 20, a scan unit 22, a boarding pass output unit 24, a communication interface 26, a second camera 30, a baggage tag output unit 32, and a receiving unit 34. Hereinafter, the interface is referred to as an "I/F."

The display unit 12 is configured to display various information. The operation unit 14 includes a plurality of keys. The user C1 can input various instructions to the boarding reception device 10 by operating the operation unit 14. Further, the display unit 12 according to the present embodiment is configured as a touch panel so that it can also function as an operation unit. Hereinafter, the "operation unit 14" refers to both the operation unit 14 itself and the display unit 12 which is a touch panel.

The information code reading unit 16 is a reading device for reading an information code such as a two-dimensional code and obtaining information recorded in the information code. For example, the user C1 can use the information code reading unit 16 to read an information code in which reservation information of a boarding pass is recorded, and input various information to the boarding reception device 10.

The IC chip reading unit 18 is a reading device for reading an IC chip via a short-range wireless communication with the IC chip built in a portable terminal or the like carried by the user C1 to obtain information recorded in the IC chip. For example, the user C1 carrying a portable terminal or the like with a built-in IC chip, in which reservation information of a boarding pass is recorded, can bring the portable terminal close to the IC chip reading unit 18 so that the IC chip reading unit 18 can read the IC chip and input various information to the boarding reception device 10.

Figure 13:
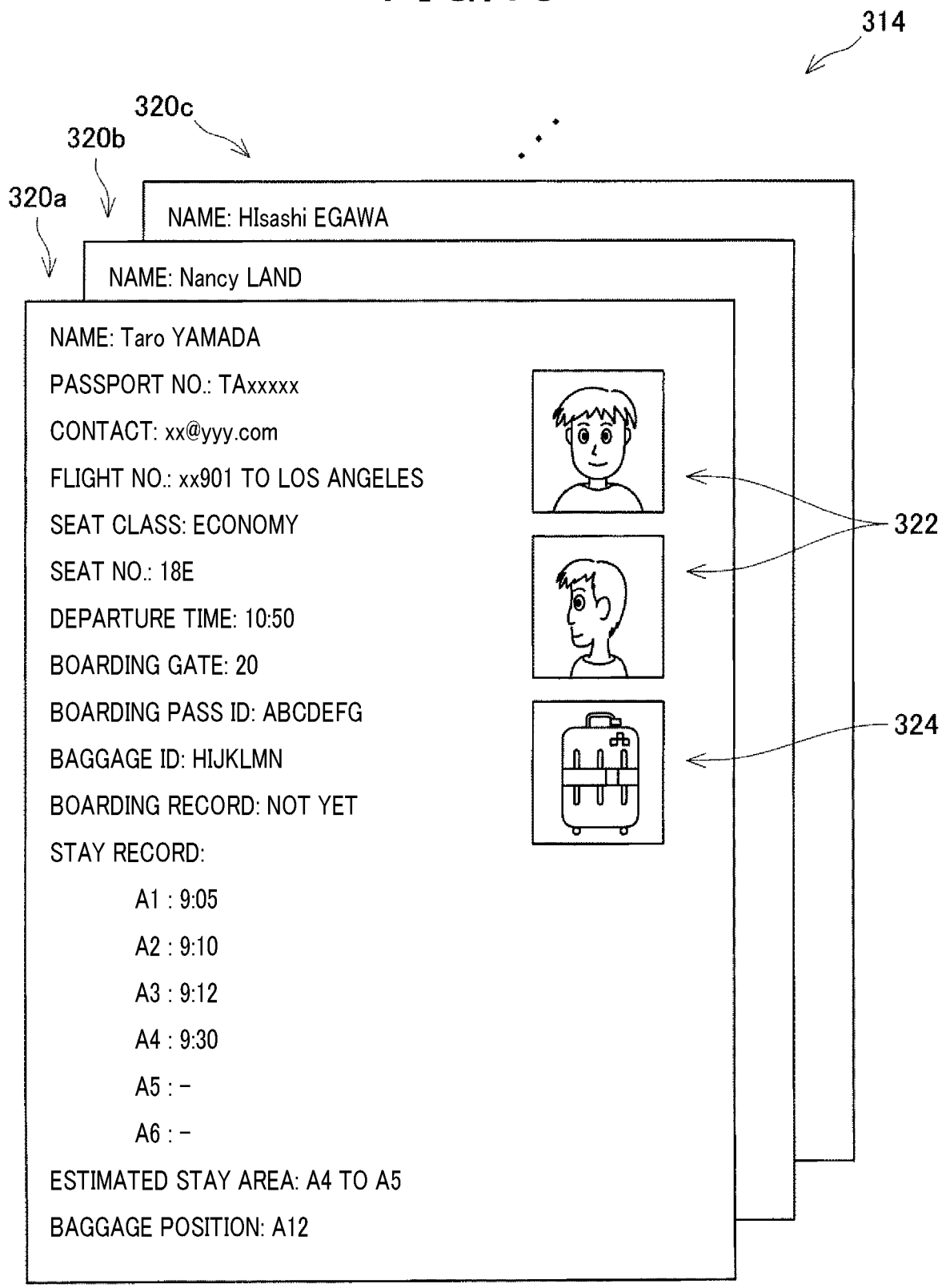
FIG. 13 is a diagram illustrating an example of contents stored in a database 314.

The first camera 20 is an imaging device for capturing a range including the face of the user C1 standing in front of the boarding reception device 10 to obtain a user image (see reference numeral 322 in FIG. 13). The first camera 20 may include a plurality of cameras, including a camera for capturing an image of the user C1 from the front and a camera for capturing an image of the user C1 from the side.

The scan unit 22 is a scan mechanism such as a CCD (solid-state imaging device) or a CIS (contact image sensor). The scan unit 22 scans a passport owned by the user C1, and generates a scan image of the passport.

The boarding pass output unit 24 is a device that outputs a boarding pass after the user C1 finishes inputting various information. The boarding pass shows various information (for example, name, contact information of the user C1, flight number, destination, departure time, seat number, boarding gate number, and unique boarding pass ID assigned by an airline in association with the various information of the user C1), which includes a part of the various information inputted by the user C1.

The communication I/F 26 is connected to the network 4 (for example, the Internet).

The second camera 30 is an imaging device for capturing an image of the baggage B1 that the user C1 is desired to check-in to the scheduled boarding plane PD and obtaining a baggage image (see reference numeral 324 in FIG. 13). FIG. 1 shows an example in which the user C1 checks-in only the baggage B1. However, when the user C1 checks-in a plurality of baggage items, the second camera 30 captures each baggage item and obtains baggage images. The second camera 30 of the present embodiment can capture an image of the baggage B1 placed within a predetermined range in front of the boarding reception device 10. In another example, the second camera 30 may capture an image of the baggage B1 placed on the receiving unit 34.

The baggage tag output unit 32 shown in FIG. 3 is a device for outputting a baggage tag 50 to be attached to the baggage B1 to be checked-in. The baggage tag 50 is a strip-shaped medium that can be tied and attached to a handle or the like of the baggage B1. The surface of the baggage tag 50 shows various information (for example, name, contact information, flight number, destination, unique baggage ID assigned by an airline in association with the various information of the user C1 (baggage ID), and the like), which includes a part of the various information inputted by the user C1.

As shown in FIG. 3, the baggage tag 50 of the present embodiment incorporates the RF tag 52. The RF tag 52 of the present embodiment is a passive tag that can perform wireless communication using an RFID (radio frequency identifier) technology. When outputting the baggage tag 50, the baggage tag output unit 32 records various information including the above baggage ID in the RF tag 52. Accordingly, various information including the baggage ID is recorded in the RF tag 52 incorporated in the baggage tag 50 outputted from the baggage tag output unit 32. The user C1 attaches the baggage tag 50 outputted from the baggage tag output unit 32 to the baggage B1 to be checked-in.

The receiving unit 34 is a device for receiving the baggage B1 with the baggage tag 50 attached thereto and transporting the baggage B1 toward a loading position for loading it onto the scheduled boarding plane PD. As shown in FIG. 1, the receiving unit 34 includes a conveyor (transport device) for transporting the received baggage B1. The receiving unit 34 is configured to measure the weight and size of the baggage B1.

The control unit 40, which is provided with a CPU (not shown), is configured to execute various processes according to programs stored in the memory 42. The memory 42 is configured with a RAM, a ROM, or the like, and stores programs for the control unit 40 to execute various processes. Further, the memory 42 includes a storage area for storing various information that is obtained and generated when the control unit 40 executes various processes.

In the present embodiment, the control unit 40 obtains various information of the user C1 inputted via the operation unit 14, various information of the user C1 obtained by the information code reading unit 16 reading the information code, and various information of the user C1 obtained by the IC chip reading unit 18 reading the IC chip. In addition, the control unit 40 obtains a user image captured by the first camera 20. The control unit 40 further obtains a scan image of a passport scanned by the scan unit 22. The control unit 40 extracts a photograph image of the user C1 and various character information such as name and passport number from the scan image of the passport. Then, the control unit 40 compares the extracted photograph image of the user C1 with the user image captured by the first camera 20 to confirm that the person in the photograph of the passport is the same person as the person present in front of the boarding reception device 10. Further, the control unit 40 compares the extracted character information with various information obtained from the operation unit 14, the information code reading unit 16, and the IC chip reading unit 18 to confirm that the personal information of the user included in the various information (such as name and passport number) matches the information described in the passport.

Then, the control unit 40 generates user data which includes various information obtained from the operation unit 14, the information code reading unit 16, and the IC chip reading unit 18 (such as name, contact information, flight number, seat number, and departure time) and various information extracted from the scan image of the passport (such as passport number). In other words, the user data includes various information for identifying the user. Subsequently, the control unit 40 generates a unique boarding pass ID associated with the user data and the user image obtained from the first camera 20. The control unit 40 causes the boarding pass output unit 24 to output a boarding pass which shows the boarding pass ID and at least part of the user data. Accordingly, the user C1 can receive the boarding pass.

Furthermore, the control unit 40 obtains a baggage image captured by the second camera 30. The control unit 40 generates a baggage ID associated with the above user data and the boarding pass ID. The control unit 40 causes the baggage tag output unit 32 to record the baggage ID, the boarding pass ID, and at least part of the user data in the RF tag 52 and on the surface of the baggage tag 50. The information recorded in the RF tag 52 may also be referred to as "tag information." Then, the control unit 40 causes the baggage tag output unit 32 to output the baggage tag 50. Thus, the user C1 can receive the baggage tag 50. Then, the user C1 attaches the baggage tag 50 to the baggage B1 and places the baggage B1 on the receiving unit 34. The receiving unit 34 transports the baggage B1 placed thereon toward the loading position.

The control unit 40 generates user-related information, which includes the user data (that is, various information for identifying the user), the user image, the boarding pass ID, the baggage image, and the baggage ID, and transmits the user-related information to the server 300 via the communication I/F 26 and the network 4. Thus, the passenger data related to the user C1 (reference numeral 320a in FIG. 13) is stored in the database 314 of the server 300, as will be described later. Accordingly, each device in the present system can execute various processes with reference to the passenger data related to the user C1 stored in the database 314.

When all the processes described above are performed, the user C1 completes the check-in using the boarding reception device 10.

Figure 4:
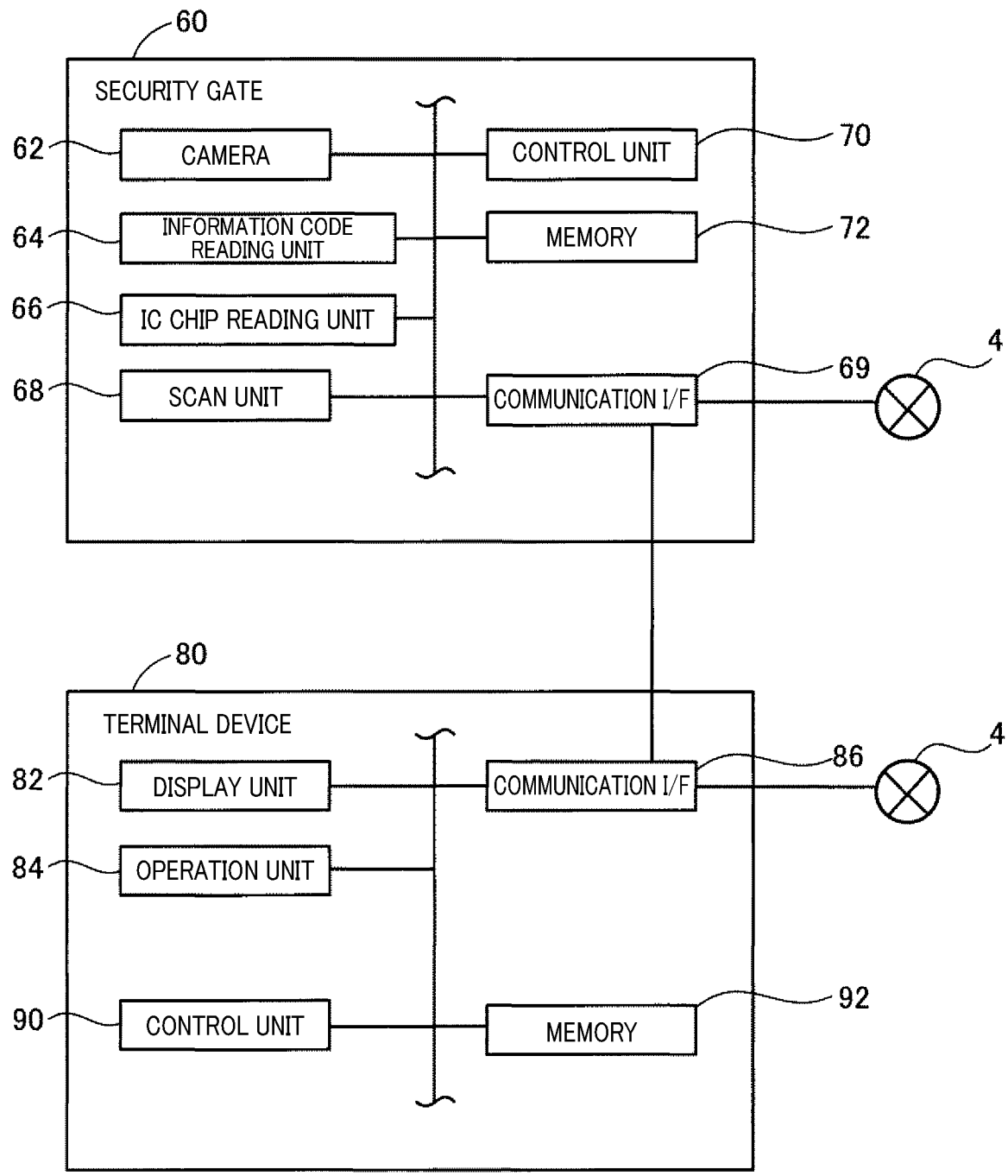
FIG. 4 is a block diagram illustrating a configuration of a security gate 60 and a configuration of a terminal device 80.

Security Gate 60 and Terminal Device 80; FIG. 1 and FIG. 4

As shown in FIG. 1, the security gate 60 and the terminal device 80 are provided in an area A1 near the entrance of the passenger lobby BL. The security gate 60 is a gate device for performing checks such as ticket check and security check when the user C1 is about to enter the passenger lobby BL after completing the check-in process. The terminal device 80 is a terminal device installed near the security gate 60, whereby a security staff member ST1 monitors the inspection status. In the present embodiment, the security gate 60 and the terminal device 80 are configured as separate devices. However, in another example, the security gate 60 can be configured to perform the function of the terminal device 80 as well.

As shown in FIG. 4, the security gate 60 includes a camera 62, an information code reading unit 64, an IC chip reading unit 66, a scan unit 68, a communication I/F 69, a control unit 70, and a memory 72.

The camera 62 is an imaging device for capturing a range including the face of the user C1 who are passing through the security gate 60 and obtaining a user image (see reference numeral 322 in FIG. 13). The camera 62 may include a plurality of cameras, including a camera for capturing an image of the user C1 from the front and a camera for capturing an image of the user C1 from the side.

The information code reading unit 64 is a reading device for reading an information code such as a two-dimensional code and obtaining information recorded in the information code. For example, the user C1 can use the information code reading unit 64 to read an information code recorded on the boarding pass, and input various information (for example, the boarding pass ID and a part of the user data) to the security gate 60.

The IC chip reading unit 66 is a reading device for reading an IC chip via a short-range wireless communication with the IC chip built in a portable terminal or the like carried by the user C1 to obtain information recorded in the IC chip. For example, the user C1 may carry a portable terminal in which the same information as the boarding pass is recorded in the IC chip instead of carrying the boarding pass of a paper medium. In this case, the user C1 can bring the portable terminal close to the IC chip reading unit 66 to read the IC chip, instead of using the information code reading unit 64 to read the boarding pass, and input various information to the security gate 60.

The scan unit 68 is a scan mechanism such as a CCD or a CIS. The scan unit 68 scans a passport owned by the user C1, and generates a scan image of the passport.

The communication I/F 69 is connected to the network 4. Furthermore, the communication I/F 69 is connected via a wire to the communication I/F 86 of the terminal device 80 and configured to directly communicate therewith.

The control unit 70, which is provided with a CPU (not shown), is configured to execute various processes according to programs stored in the memory 72. The memory 72 is configured with a RAM, a ROM, or the like, and stores programs for the control unit 70 to execute various processes. Further, the memory 72 includes a storage area for storing various information that is obtained and generated when the control unit 70 executes various processes. In addition, the memory 72 stores area information indicating the area A1, which is an area where it is installed.

As shown in FIG. 4, the terminal device 80 includes a display unit 82, an operation unit 84, a communication I/F 86, a control unit 90, and a memory 92.

The display unit 82 is configured to display various information. The operation unit 84 includes a keyboard and a mouse. The security staff member ST1 can input various instructions to the terminal device 80 by operating the operation unit 84. Further, the display unit 82 may be configured as a touch panel or function as the operation unit 84.

The communication I/F 86 is connected to the network 4. Further, the communication I/F 86 is connected via a wire to the communication I/F 69 of the security gate 60 and configured to directly communicate therewith.

The control unit 90, which is provided with a CPU (not shown), is configured to execute various processes according to programs stored in the memory 92. The memory 92 is configured with a RAM, a ROM, or the like, and stores programs for the control unit 90 to execute various processes. Further, the memory 92 includes a storage area for storing various information that is obtained and generated when the control unit 90 executes various processes. In addition, the memory 92 stores area information indicating the area A1, which is an area where it is installed.

In the present embodiment, the control unit 70 of the security gate 60 obtains various information of the user C1 (such as user data, boarding pass ID, and baggage ID) obtained by the information code reading unit 64 or the IC chip reading unit 66. Furthermore, the control unit 70 obtains a user image captured by the camera 62. The control unit 70 further obtains a scan image of a passport scanned by the scan unit 68. The control unit 70 transmits the obtained information and images to the terminal device 80 via the communication I/F 69.

The control unit 90 of the terminal device 80 obtains the information and images obtained by the security gate 60 via the communication I/F 86 as they are transmitted from the security gate 60. The control unit 90 accesses the database 314 of the server 300 via the network 4, and identifies the passenger data (see reference numeral 320a in FIG. 13) including various information (such as the name of the user C1) obtained from the security gate 60. The control unit 90 reads out the identified passenger data. Then, the control unit 90 confirms that the various information (such as the name of the user C1) obtained from the security gate 60 matches the information included in the passenger data. Further, the control unit 90 extracts the passport number and the like of the user C1 from the scan image of the passport, and confirms that they match the passport number and the like included in the passenger data. Furthermore, the control unit 90 compares the user image obtained from the security gate 60 with the user image included in the passenger data (specifically, compares the feature points of the face of the user between both images), and confirms that the person present in front of the security gate 60 is the same person as the person that has checked-in using the boarding reception device 10.

When the confirmation is completed, the control unit 90 performs a permission operation for permitting the user C1 to pass through the security gate 60. In this operation, the control unit 90 associates the area information indicating the area A1, which is an area where it is installed, time information indicating the time of this point, and a part of the passenger data (for example, boarding pass ID) to each other, and transmits these to the server 300 via the communication I/F 86 and the network 4. Thus, information indicating that the user C1 has stayed in the area A1 and information indicating the latest stay time are added to the passenger data related to the user C1 (see reference numeral 320a in FIG. 13) in the database 314 of the server 300.

When a predetermined known security checks in addition to the above processes are all completed, the user C1 can enter the passenger lobby BL. Since the user C1 who has entered the passenger lobby BL usually only has to arrive the boarding gate 110 by the boarding start time, he/she may spend time while moving around in the passenger lobby BL, or shopping or eating at the stores in the passenger lobby BL.

Figure 5:
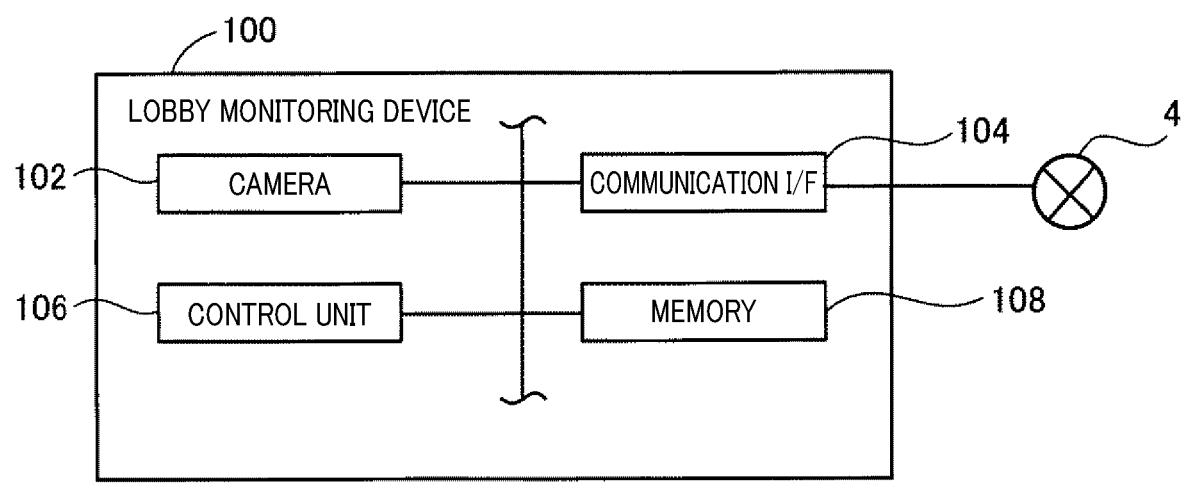
FIG. 5 is a block diagram illustrating a configuration of a lobby monitoring device 100.

Lobby Monitoring Device 100; FIG. 1 and FIG. 5

As shown in FIG. 1, a plurality of lobby monitoring devices 100 are provided in the passenger lobby BL. The lobby monitoring device 100 is a device for monitoring users staying in the area where it is installed. In the example of FIG. 1, four lobby monitoring devices 100 are provided to monitor the areas A2, A3, A4, and A5, respectively, in the passenger lobby BL.

The respective lobby monitoring devices 100 have the same configuration. As shown in FIG. 5, the lobby monitoring device 100 includes a camera 102, a communication I/F 104, a control unit 106, and a memory 108.

The camera 102 captures an image of the inside of the area where it is installed. For example, the camera 102 of the lobby monitoring device 100 installed in the area A2 captures an image of the entire area of the area A2. The communication I/F 104 is connected to the network 4. The control unit 106, which is provided with a CPU (not shown), is configured to execute various processes according to programs stored in the memory 108. The memory 108 is configured with a RAM, a ROM, or the like, and stores programs for the control unit 106 to execute various processes. Further, the memory 108 includes a storage area for storing various information that is obtained and generated when the control unit 106 executes various processes. In addition, the memory 108 stores area information indicating the area where it is installed. For example, the camera 108 of the lobby monitoring device 100 installed in the area A2 stores area information indicating the area A2.

The control unit 106 of the lobby monitoring device 100 monitors the image of the installation area captured by the camera 102. When an image of the user is included in the image captured by the camera 102, feature points of the face are extracted from the image of the user. Simultaneously, the control unit 106 accesses the database 314 of the server 300 via the communication I/F 104 and the network 4, and identifies the passenger data including the user image having the feature points common to the extracted feature points (that is, the image of the same person as the user included in the image captured by the camera 102). In this case, the control unit 106 associates the area information indicating the area where it is installed, time information indicating the time of this point, and a part of the passenger data (for example, boarding pass ID) to each other, and transmits these to the server 300 via the communication I/F 104 and the network 4. Thus, information indicating that the user has stayed in the installation area and information indicating the latest stay time are added to the passenger data related to the user (for example, reference numeral 230a related to the user C1 in FIG. 13) in the database 314 of the server 300.

Figure 6:
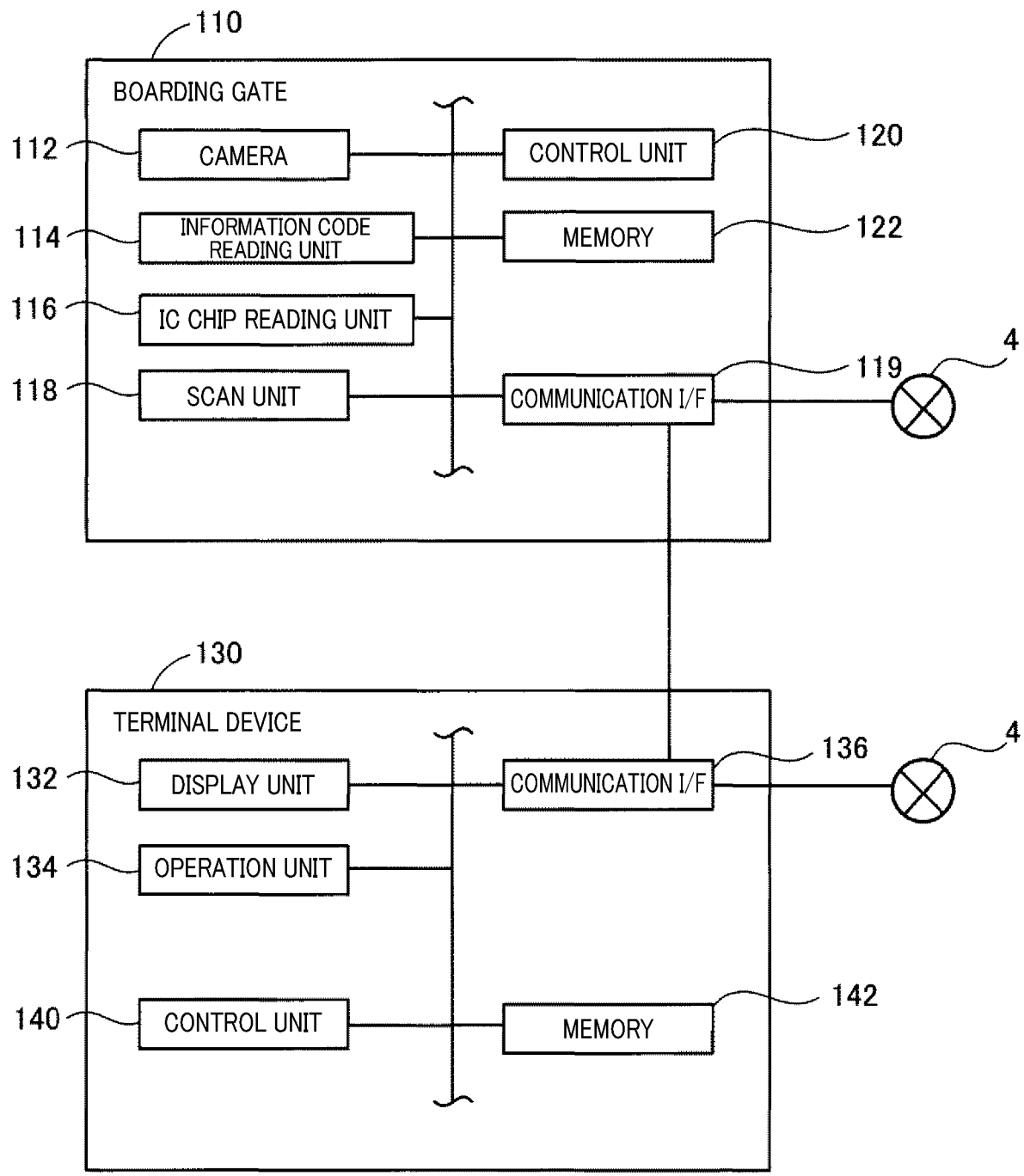
FIG. 6 is a block diagram illustrating a configuration of a boarding gate 110 and a configuration of a terminal device 130.

Boarding Gate 110 and Terminal Device 130; FIG. 1 and FIG. 6

As shown in FIG. 1, the boarding gate 110 and the terminal device 130 are provided in an area A6 of the passenger lobby BL near a boarding gate for the scheduled boarding plane PD. The boarding gate 110 is a gate device for performing checks such as a final ticket check and an identity verification when the user C1 scheduled to board the scheduled boarding plane PD is about to board the scheduled boarding plane PD. The terminal device 130 is a terminal device for a boarding staff member (airline ground staff member) ST3 to monitor the inspection status and is installed near the boarding gate 110. In the present embodiment, the boarding gate 110 and the terminal device 130 are configured as separate devices. However, in another example, the boarding gate 110 can be configured to perform the function of the terminal device 130 as well.

As shown in FIG. 6, the boarding gate 110 includes a camera 112, an information code reading unit 114, an IC chip reading unit 116, a scan unit 118, a communication I/F 119, a control unit 120, and a memory 122.

The camera 112 is an imaging device for capturing a range including the face of the user C1 who are passing through the boarding gate 110 to obtain a user image (see reference numeral 322 in FIG. 13). The camera 112 may include a plurality of cameras, including a camera for capturing an image of the user C1 from the front and a camera for capturing an image of the user C1 from the side.

The information code reading unit 114 is a reading unit for reading an information code such as a two-dimensional code and obtaining information recorded in the information code. For example, the user C1 can use the information code reading unit 114 to read an information code recorded on the boarding pass, and input various information (for example, the boarding pass ID and a part of the user data) to the boarding gate 110.

The IC chip reading unit 116 is a reading unit for reading an IC chip via a short-range wireless communication with the IC chip built in a portable terminal or the like carried by the user C1 to obtain information recorded in the IC chip. The user C1 can bring the portable terminal close to the IC chip reading unit 66 to read the IC chip, instead of using the information code reading unit 114 to read the boarding pass, and input various information to the boarding gate 110.

The scan unit 118 is a scan mechanism such as a CCD or a CIS. The scan unit 118 scans a passport owned by the user C1, and generates a scan image.

The communication I/F 119 is connected to the network 4. Furthermore, the communication I/F 119 is connected via a wire to the communication I/F 136 of the terminal device 130 and configured to directly communicate therewith.

The control unit 120, which is provided with a CPU (not shown), is configured to execute various processes according to programs stored in the memory 122. The memory 122 is configured with a RAM, a ROM, or the like, and stores programs for the control unit 120 to execute various processes. Further, the memory 122 includes a storage area for storing various information that is obtained and generated when the control unit 120 executes various processes. In addition, the memory 122 stores area information indicating the area A6, which is an area where it is installed.

As shown in FIG. 6, the terminal device 130 includes a display unit 132, an operation unit 134, a communication I/F 136, a control unit 140, and a memory 142.

The display unit 132 is configured to display various information. The operation unit 134 includes a keyboard and a mouse. The boarding staff member ST3 can input various instructions to the terminal device 130 by operating the operation unit 134. Further, the display unit 132 may be configured as a touch panel or function as the operation unit 134.

The communication I/F 136 is connected to the network 4. Furthermore, the communication I/F 136 is connected via a wire to the communication I/F 119 of the boarding gate 110 and configured to directly communicate therewith.

The control unit 140, which is provided with a CPU (not shown), is configured to execute various processes according to programs stored in the memory 142. The memory 142 is configured with a RAM, a ROM, or the like, and stores programs for the control unit 140 to execute various processes. Further, the memory 142 includes a storage area for storing various information that is obtained and generated when the control unit 140 executes various processes. In addition, the memory 142 stores area information indicating the area A6, which is an area where it is installed.

In the present embodiment, the control unit 120 of the boarding gate 110 obtains various information of the user C1 (such as user data, boarding pass ID, and baggage ID) obtained by the information code reading unit 114 or the IC chip reading unit 116. Furthermore, the control unit 120 obtains a user image captured by the camera 112. The control unit 120 further obtains a scan image of a passport scanned by the scan unit 118. The control unit 120 transmits the obtained information and images to the terminal device 130 via the communication I/F 119.

The control unit 140 of the terminal device 130 obtains the information and images obtained by the boarding gate 110 via the communication I/F 136 as they are transmitted from the boarding gate 110. The control unit 140 accesses the database 314 of the server 300 via the network 4, and identifies the passenger data (see reference numeral 320a in FIG. 13) including various information (such as the name of the user C1) obtained from the boarding gate 110. The control unit 140 reads out the identified passenger data. Then, the control unit 140 confirms that the various information (such as the name of the user C1) obtained from the boarding gate 110 matches the information included in the passenger data. Further, the control unit 140 extracts the passport number and the like of the user C1 from the scan image of the passport, and confirms that they match the passport number and the like included in the passenger data. Furthermore, the control unit 140 compares the user image obtained from the boarding gate 110 with the user image included in the passenger data (specifically, compares the feature points of the face of the user between both images), and confirms that the person present in front of the boarding gate 110 is the same person as the person that has checked-in using the boarding reception device 10.

When the confirmation is completed, the control unit 140 performs a permission operation for permitting the user C1 to pass through the boarding gate 110. In this operation, the control unit 140 associates the area information indicating the area A6, which is an area where it is installed, time information indicating the time of this point, and a part of the passenger data (for example, boarding pass ID) to each other, and transmits these to the server 300 via the communication I/F 136 and the network 4. Thus, information indicating that the user C1 has stayed in the area A6, information indicating the latest stay time, and information indicating that the user C1 has been on board are added to the passenger data related to the user C1 (see reference numeral 320a in FIG. 13) in the database 314 of the server 300.

When a predetermined known boarding checks in addition to the above processes are all completed, the user C1 can board the scheduled boarding plane PD.

During the boarding check, the control unit 140 of the terminal device 130 can display a list of passenger data related to all the users scheduled to board the scheduled boarding plane PD on the display unit 132. The boarding staff member ST3 can recognize users who have already boarded and who have not yet boarded from the list displayed on the display unit 132. Further, when viewing the display unit 132, the boarding staff member ST3 can also recognize in which area of the passenger lobby BL the users who have not yet boarded are highly likely to stay.

When there is a user who does not arrive at the boarding gate 110 until near the departure time (hereinafter, also referred to as an unboarded passenger), the boarding staff member ST3 can operate the operation unit 134 to input a call operation for calling the unboarded passenger while specifying the passenger data of the unboarded passenger (that is, ask a lobby staff member ST2 to search for the unboarded passenger and appropriately guide the unboarded passenger to the boarding gate 110). In this case, the control unit 140 transmits a call signal to the server 300 via the communication I/F 136 and the network 4. The call signal includes a part of the passenger data (for example, boarding pass ID) of the unboarded passenger. In this case, as will be described later in detail, the server 300 transmits a call instruction to the staff's terminal 150 via the network 4. Then, a call screen (see reference numeral 400 in FIG. 8) is displayed on the staff's terminal 150.

Furthermore, when there is an unboarded passenger who is considered to be unlikely to arrive at the boarding gate 110 by the departure time, the boarding staff member ST3 can operate the operation unit 134 to input a baggage removal operation for removing the baggage of the unboarded passenger, which has been already loaded on the scheduled boarding plane PD, from the scheduled boarding plane PD while specifying the passenger data of the unboarded passenger (that is, ask an operator ST4 at the loading position to search for the baggage and remove the baggage from the scheduled boarding plane PD). Here, the case where an unboarded passenger is considered to be unlikely to arrive at the boarding gate 110 by the departure time refers to, for example, a case where an unboarded passenger stays at a position extremely distant from the boarding gate 110, and is unlikely to arrive at the boarding gate 110 by the departure time even if the unboarded passenger hurries to the boarding gate 110. When the boarding staff member ST3 inputs a baggage removal operation, the control unit 140 transmits a baggage removal signal to the server 300 via the communication I/F 136 and the network 4. The baggage removal signal includes a part of the passenger data (for example, baggage ID) of the unboarded passenger. In this case, as will be described later, the server 300 transmits a baggage removal instruction to the operator terminal 190 via the network 4. In this case, as will be described later in detail, the server 300 transmits a baggage removal instruction to the operator terminal 190 via the network 4. Then, a baggage removal screen (see reference numeral 500 in FIG. 11) is displayed on the operator terminal 190.

Figure 7:
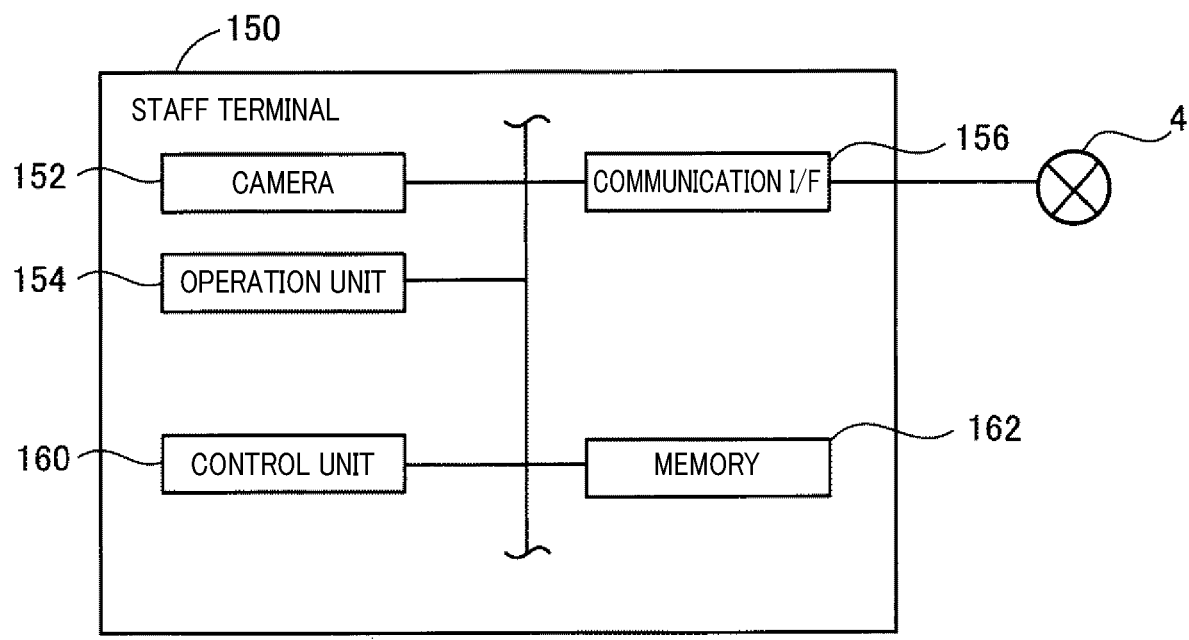
FIG. 7 is a block diagram illustrating a configuration of a staff's terminal 150.
Figure 8:
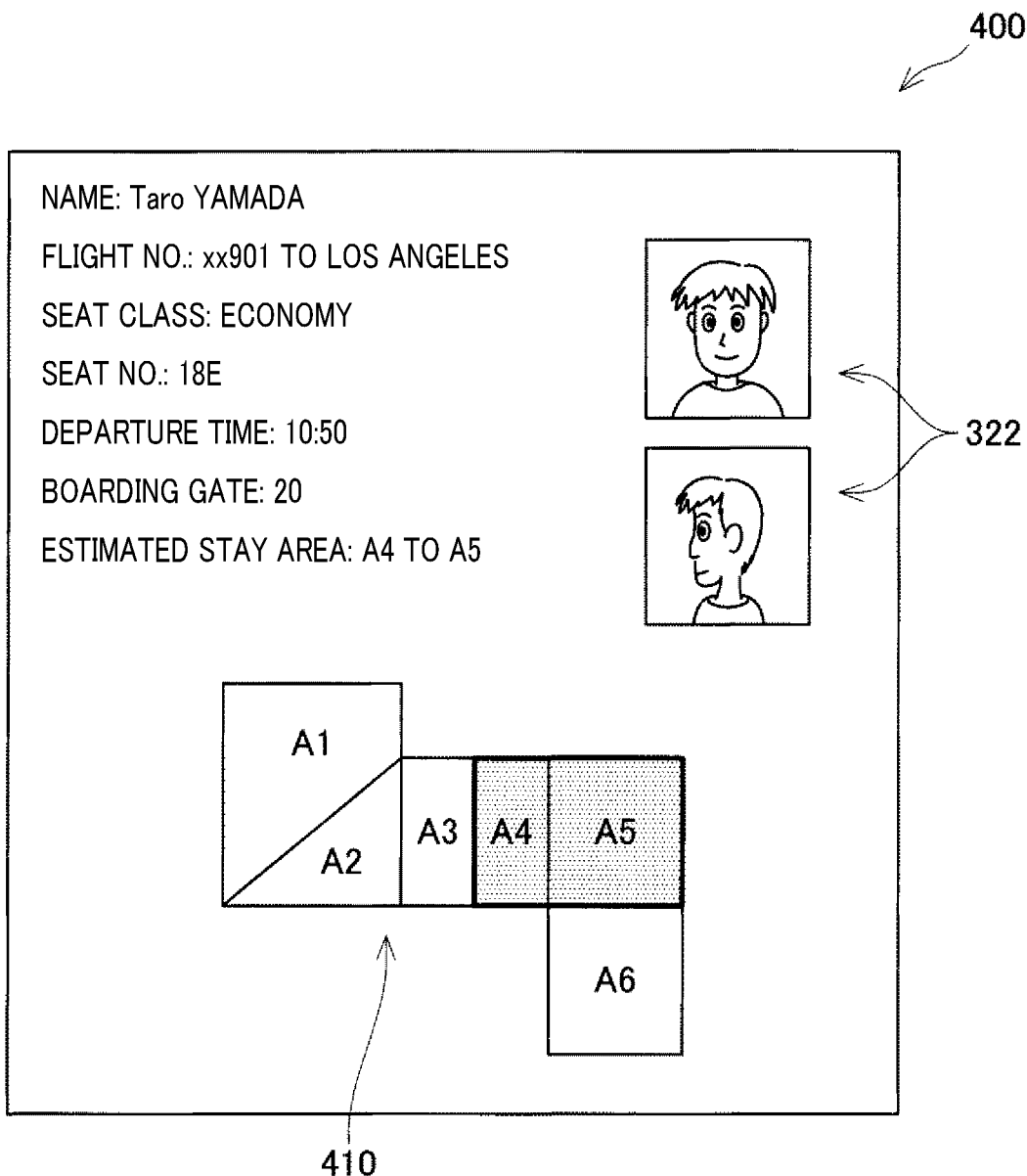
FIG. 8 is a diagram illustrating an example call screen 400 displayed on a staff's terminal 150.

Staff's Terminal 150; FIG. 1, FIG. 7, and FIG. 8

As shown in FIG. 1, the staff's terminal 150 is provided in the passenger lobby BL. Specifically, the staff's terminal 150 is a portable terminal device (for example, tablet terminal) carried by a lobby staff terminal (airline ground staff terminal) ST2 in the passenger lobby BL. The staff's terminal 150 is a terminal device for notifying the lobby staff member ST2 of information on a user who does not appear at the boarding gate 110 until near the departure time (hereinafter, also referred to as an unboarded passenger). The example shown in FIG. 1 illustrates that one staff's terminal 150 is provided in the passenger lobby BL. However, in practice, a plurality of staff's terminals 150 may be carried by a plurality of members of the lobby staff member ST2 and provided in the passenger lobby BL.

As shown in FIG. 7, the staff's terminal 150 includes a display unit 152, an operation unit 154, a communication I/F 156, a control unit 160, and a memory 162.

The display unit 152 is configured to display various information. The operation unit 154 includes a plurality of keys. The lobby staff member ST2 can input various instructions to the staff's terminal 150 by operating the operation unit 154. Further, the display unit 152 according to the present embodiment is configured as a touch panel so that it can also function as an operation unit. Hereinafter, the "operation unit 154" refers to both the operation unit 154 itself and the display unit 152 which is a touch panel. The communication I/F 156 is connected to the network 4.

The control unit 160, which is provided with a CPU (not shown), is configured to execute various processes according to programs stored in the memory 162. The memory 162 is configured with a RAM, a ROM, or the like, and stores programs for the control unit 160 to execute various processes. Further, the memory 162 includes a storage area for storing various information that is obtained and generated when the control unit 160 executes various processes.

According to the present embodiment, the control unit 160 receives a call instruction for calling the unboarded passenger from the server 300 via the communication I/F 156. In this case, the control unit 160 causes the display unit 152 to display the call screen (see FIG. 8) based on a part of the passenger data included in the call instruction.

FIG. 8 is an example call screen 400 displayed on the display unit 152 when the call instruction for calling the user C1 is received. As shown in FIG. 8, the call screen 400 displays information included in the call instruction, such as the name of the user C1, flight number, destination, seat class, seat number, departure time, and boarding gate number. The call screen 400 further displays the user image 322. In addition, the call screen 400 displays information indicating an estimated stay area of the user C1, and a map 410 illustrating the stay area. The map 410 is a map schematically illustrating the passenger lobby BL, and an area corresponding to the estimated stay area of the user C1 (areas A4 and A5 in the example shown in FIG. 8) is highlighted. The lobby staff member ST2, when viewing the call screen 400, can recognize that the user C1 should be searched for and quickly guided to the boarding gate 110, and also recognize the face of the user C1 and the estimated stay area of the user C1. While referring to the information displayed on the call screen 400, the lobby staff member ST2 can search for the user C1 and guide the user C1 to the boarding gate 110.

Figure 9:
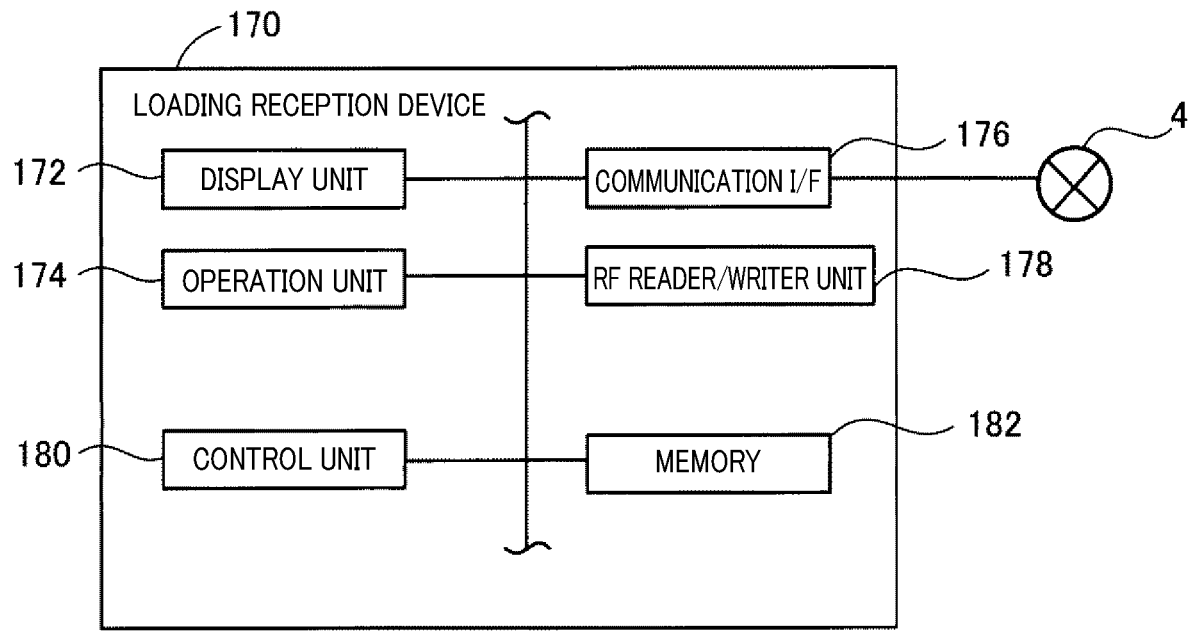
FIG. 9 is a block diagram illustrating a configuration of a loading reception device 170.

Loading Reception Device 170; FIG. 1 and FIG. 9

As shown in FIG. 1, the loading reception device 170 is a stationary device installed at a loading position where the baggage (B1 to B3 in the figure) is loaded onto the scheduled boarding plane PD. In the example shown in FIG. 1, the loading reception device 170 is provided near the transport device that transports the baggage B1 to B3 toward the scheduled boarding plane PD. In modifications, the loading reception device 170 may be a portable device that can be carried by the operator ST4. In this case, the loading reception device 170 may be integrally formed with the operator terminal 190, which will be described later. The loading reception device 170 of the present embodiment is a device for reading tag information recorded in the RF tag 52 of the baggage tag 50 attached to the baggage (that is, baggage image, baggage ID, boarding pass ID, and at least part of the user data), and associating the read information with loading position-related information regarding the loading position of the baggage on the scheduled boarding plane PD.

In the example shown in FIG. 1, the items of the baggage B1 to B3 transported to the scheduled boarding plane PD by the transport device are directly loaded into any area (front, middle, rear, or the like) of a cargo compartment in the scheduled boarding plane PD. This loading method is called "bulk method." The bulk method is usually used when the scheduled boarding plane PD is a small or medium aircraft. On the other hand, when the scheduled boarding plane PD is a large aircraft, a method called "container method" is used. In the container method, the baggage is loaded in any of a plurality of containers at a loading position. Then, the plurality of containers in which baggage items are loaded are accommodated in a container compartment in the scheduled boarding plane PD. The present embodiment describes the example in which the baggage items are loaded by the bulk method. However, in the case where the baggage items are loaded in the container method, the processes executed by the devices are basically the same as those in the bulk method.

As shown in FIG. 9, the loading reception device 170 includes a display unit 172, an operation unit 174, a communication I/F 176, an RF reader/writer unit 178, a control unit 180, and a memory 182.

The display unit 172 is configured to display various information. The operation unit 174 includes a plurality of keys. The operator ST4 can input various instructions to the loading reception device 170 by operating the operation unit 174. Further, the display unit 172 according to the present embodiment is configured as a touch panel so that it can also function as an operation unit. The communication I/F 176 is connected to the network 4.

The RF reader/writer unit 178 is a device that can perform RFID wireless communication with the RF tag 52 of the baggage tag 50. The RF reader/writer unit 178 performs wireless communication with the RF tag 52 located within a communication range to read tag information recorded in the RF tag 52 (that is, baggage image, baggage ID, boarding pass ID, and at least part of the user data), and cause the RF tag 52 to record loading position-related information.

The control unit 180, which is provided with a CPU (not shown), is configured to execute various processes according to programs stored in the memory 182. The memory 182 is configured with a RAM, a ROM, or the like, and stores programs for the control unit 180 to execute various processes. Further, the memory 182 includes a storage area for storing various information that is obtained and generated when the control unit 180 executes various processes.

While the loading reception device 170 is ON, the control unit 180 causes the RF reader/writer unit 178 to continuously output a radio wave toward the communication range. As the baggage B1 (baggage of the user C1) that has been transported by the transport device reaches the communication range, the RF tag 52 of the baggage tag 50 attached to the baggage B1 receives the radio wave outputted from the RF reader/writer unit 178 and start RFID wireless communication with the RF reader/writer unit 178. The control unit 180 causes the RF reader/writer unit 178 to read tag information recorded in the RF tag 52 (that is, baggage image, baggage ID, boarding pass ID, and at least part of the user data). Then, the control unit 180 generates loading position-related information associated with the read tag information. The control unit 180 generates loading position-related information according to the number of baggage items already loaded on the scheduled boarding plane PD. The control unit 180 associates the generated loading position-related information with the read tag information and transmits the associated loading position-related information and tag information to the server 300 via the communication I/F 176. Thus, information indicating that the baggage B1 of the user C1 has been loaded in the area A12 (see FIG. 11) of the scheduled boarding plane PD is added to the passenger data (see reference numeral 320a in FIG. 13) regarding the user C1 in the database 314 of the server 300. Further, the control unit 180 causes the RF reader/writer unit 178 to record the generated loading position-related information in the RF tag 52.

Then, the baggage B1 is further transported by the transport device, and loaded onto the scheduled boarding plane PD.

Figure 10:
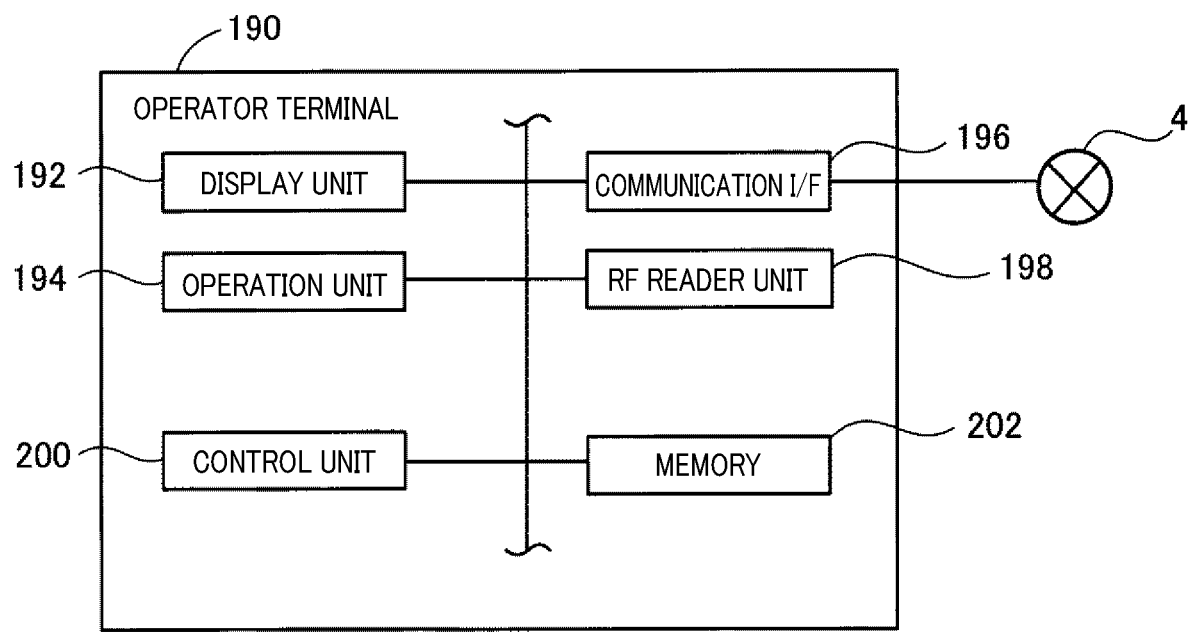
FIG. 10 is a block diagram illustrating a configuration of an operator terminal 190.

Operator Terminal 190; FIG. 1 and FIG. 10

As shown in FIG. 1, the operator terminal 190 is provided at the loading position. Specifically, the operator terminal 190 is a portable terminal device (for example, a handy terminal or a tablet terminal) carried by an operator (airport staff member) ST4 at the loading position. The operator terminal 190 is a terminal device for notifying the operator ST4 of information on baggage of an unboarded passenger who does not appear at the boarding gate 110 until near the departure time and is unlikely to arrive at the boarding gate 110 by the departure time (that is, the baggage that should be removed from the scheduled boarding plane PD).

As shown in FIG. 10, the operator terminal 190 includes a display unit 192, an operation unit 194, a communication I/F 196, an RF reader unit 198, a control unit 200, and a memory 202.

The display unit 192 is configured to display various information. The operation unit 194 includes a plurality of keys. The operator ST4 can input various instructions to the operator terminal 190 by operating the operation unit 194. Further, the display unit 192 according to the present embodiment is configured as a touch panel so that it can also function as an operation unit. The communication I/F 196 is connected to the network 4.

The RF reader unit 198 is a device that can perform RFID wireless communication with the RF tag 52 of the baggage tag 50. The RF reader unit 198 performs wireless communication with the RF tag 52 located within a communication range to read tag information recorded in the RF tag 52 (that is, baggage image, baggage ID, boarding pass ID, at least part of the user data, and loading position-related information recorded by the loading reception device 170). In the present embodiment, the RF reader unit 198 does not have a function as a writer that records information in the RF tag 52. However, in modifications, the RF reader unit 198 may have a function as a writer.

The control unit 200, which is provided with a CPU (not shown), is configured to execute various processes according to programs stored in the memory 202. The memory 202 is configured with a RAM, a ROM, or the like, and stores programs for the control unit 200 to execute various processes. Further, the memory 202 includes a storage area for storing various information that is obtained and generated when the control unit 200 executes various processes.

According to the present embodiment, the control unit 200 receives a baggage removal instruction for removing the baggage of the unboarded passenger from the server 300 via the communication I/F 196. In this case, the control unit 200 causes the display unit 192 to display the baggage removal screen (see FIG. 11) based on a part of the passenger data included in the baggage removal instruction.

Figure 11:
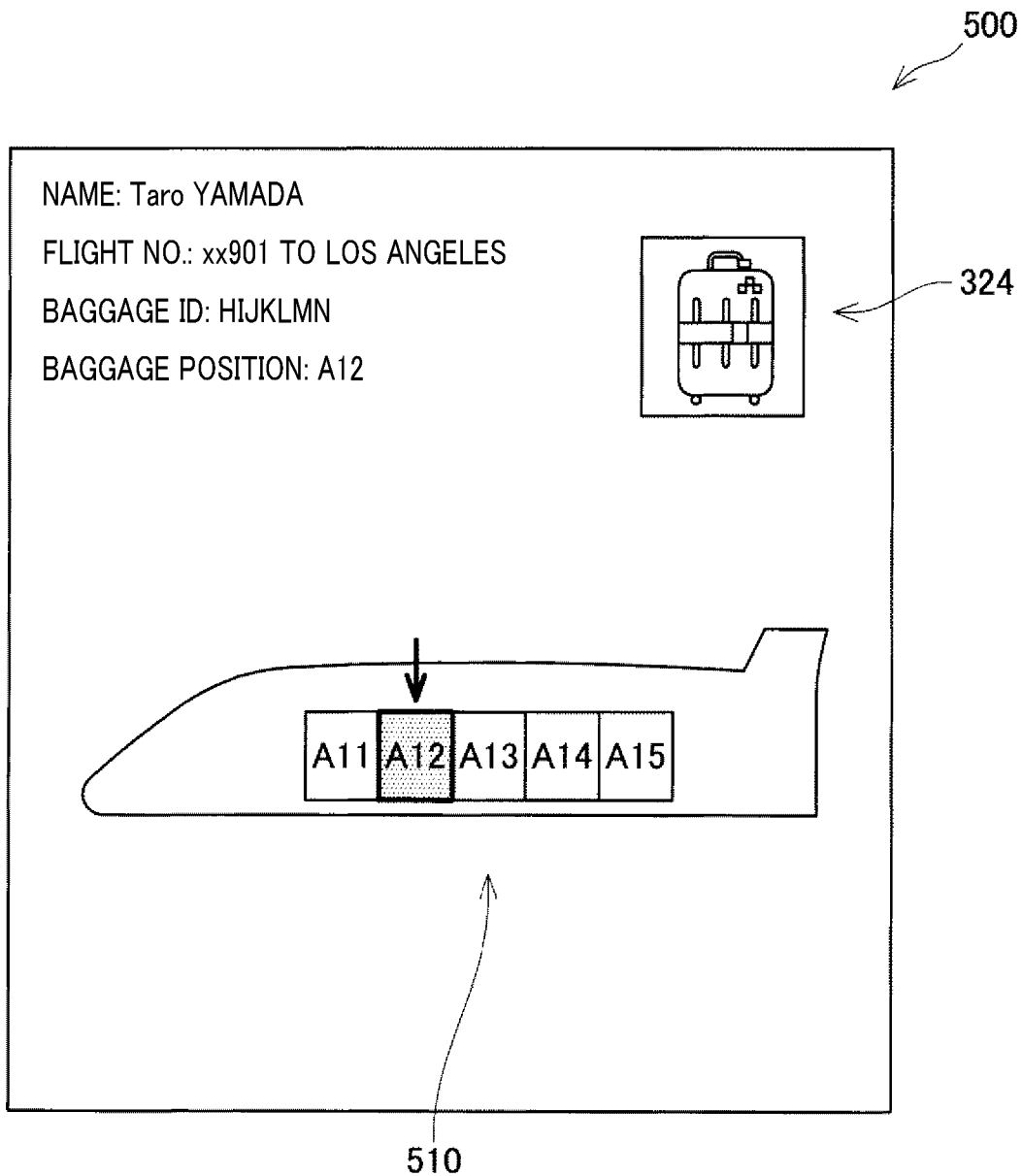
FIG. 11 is a diagram illustrating an example baggage removal screen 500 displayed on an operator terminal 190.

FIG. 11 is an example baggage removal screen 500 displayed on the display unit 192 when the baggage removal instruction for removing the baggage B1 of the user C1 is received. As shown in FIG. 11, the baggage removal screen 500 displays information included in the baggage removal instruction, such as the name of the user C1, flight number, destination, and baggage ID. The baggage removal screen 500 further displays the baggage image 324. In addition, the baggage removal screen 500 displays information indicating the loading position of the baggage B1 provided by the loading position-related information, and a map 510 illustrating the loading position. The map 510 is a map schematically illustrating the baggage compartment of the scheduled boarding plane PD, and an area corresponding to the loading position of the baggage B1 (area A12 in the example shown in FIG. 11) is highlighted. When viewing the baggage removal screen 500, the operator ST4 can recognize that the baggage B1 should be searched for and quickly removed from the scheduled boarding plane PD, and also recognize the appearance of the baggage B1 and the loading position of the baggage B1. While referring to the information displayed on the baggage removal screen 500, the operator ST4 can search for the baggage B1 and remove the baggage B1 from the scheduled boarding plane PD. In addition, after removing the baggage B1 from the scheduled boarding plane PD, the operator ST4 operates the operation unit 194 of the operator terminal 190 to perform a predetermined completion operation. As the completion operation is performed, the control unit 200 of the operator terminal 190 transmits a predetermined baggage removal completion notification to the server 300.

In the present embodiment, when searching for the baggage B1, the operator ST4 can operate, for example, the operation unit 194 to input a predetermined searching operation while specifying a desired baggage ID (for example, the baggage ID of the baggage B1). In this case, the control unit 200 causes the RF reader unit 198 to output a radio wave and transmit a search signal including the specified baggage ID toward the communication range. When the RF tag 52 in which the specified baggage ID is recorded receives the search signal, the RF tag 52 transmits the recorded tag information (that is, baggage ID, boarding pass ID, at least part of the user data, and loading position-related information recorded by the loading reception device 170) to the operator terminal 190. That is, RFID wireless communication is performed between the RF reader unit 198 and the RF tag 52. Thus, the control unit 200 can obtain the tag information via the RF reader unit 198. The control unit 200 can display information indicating the loading position of the baggage B1 provided by the loading position-related information and the map 510 illustrating the loading position based on the loading position-related information included in the obtained tag information. That is, in the present embodiment, when searching for the baggage B1, the operator ST4 can cause the RF reader unit 198 and the RF tag 52 to perform wireless communication with each other to thereby obtain the loading position-related information from the RF tag 52, and display the position of the baggage B1 in the baggage removal screen 500 based on the obtained loading position-related information. Accordingly, even when the operator terminal 190 does not receive a baggage removal instruction from the server 300, the operator terminal 190 can display the baggage removal screen indicating the position of the desired baggage.

Server 300; FIG. 1, FIG. 2, FIG. 12, and FIG. 13

The server 300 is a device for managing passenger data for each user. As described above, the servers 300 are respectively provided at the departure airport and the arrival airport (see FIGS. 1 and 2), and synchronized with each other via the network 4 to function as one server.

Figure 12:
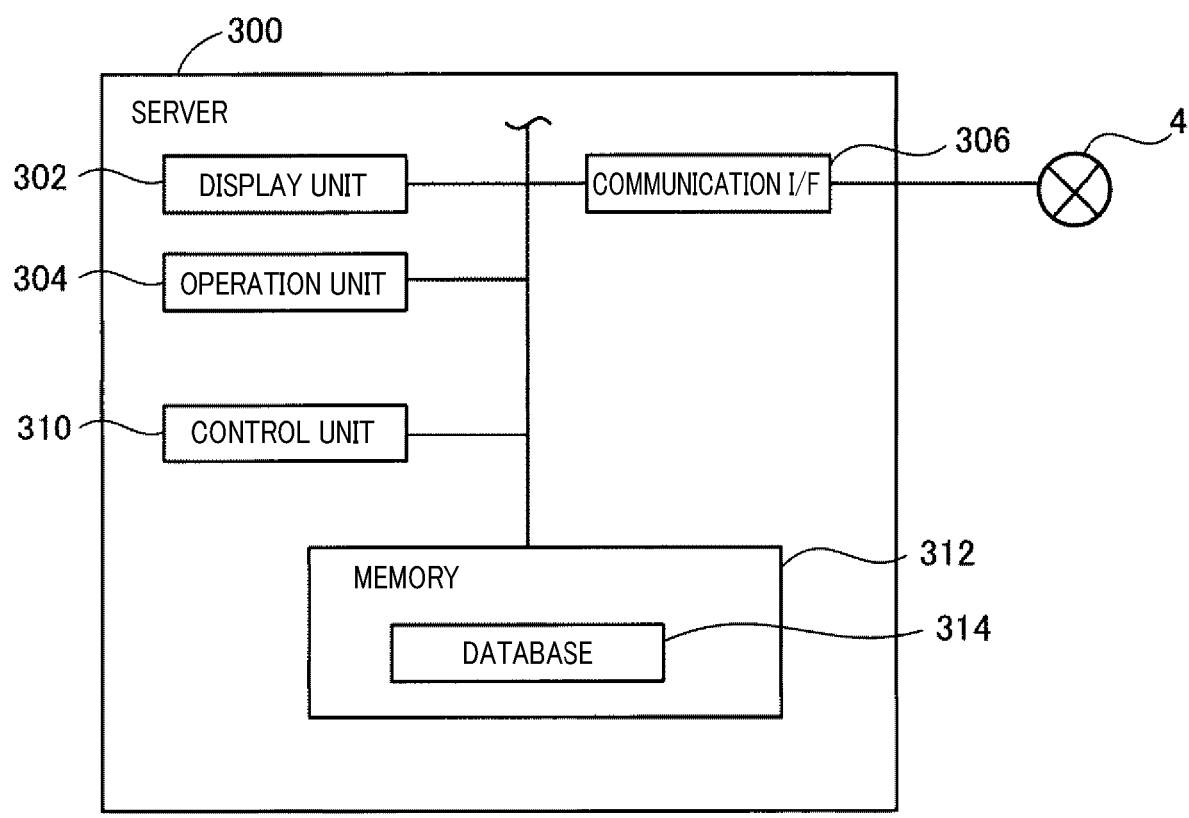
FIG. 12 is a block diagram illustrating a configuration of a server 300.

As shown in FIG. 12, the server 300 includes a display unit 302, an operation unit 304, a communication I/F 306, a control unit 310, and a memory 312.

The display unit 302 is configured to display various information. The operation unit 304 includes a keyboard and a mouse. An administrator of the system (not shown) can input various instructions to the server 300 by operating the operation unit 304. The communication I/F 306 is connected to the network 4.

The control unit 310, which is provided with a CPU (not shown), is configured to execute various processes according to programs stored in the memory 312. The memory 312 is configured with a RAM, a ROM, or the like, and stores programs for the control unit 310 to execute various processes. In the present embodiment, the memory 312 includes the database 314 that stores passenger data for each user.

With reference to FIG. 13, storage contents of the database 314 will be described. As shown in FIG. 13, the database 314 stores passenger data 320a to 320c for each user. In the example shown in FIG. 13, the passenger data 320a is passenger data of the user C1. The passenger data 320a includes the name of the user C1 ("Taro YAMADA"), passport number ("TAXXXX"), contact information ("xx@yyy.com"), flight number and destination ("XX901 to Los Angeles"), seat class ("economy"), seat number ("18E"), departure time ("10:50"), boarding gate ("20"), boarding pass ID ("ABCDEFG"), baggage ID ("HIJKLMN"), boarding record ("not yet"), stay record (e.g., "A1: 9:05"), estimated stay area ("A4 to A5"), and baggage position ("A12"). The passenger data 320a further includes the user image 322 of the user C1 and the baggage image 324 of the baggage B1. In the passenger data 320a, these information items are associated with each other.

The control unit 310 of the server 300 performs the following processes at the departure airport.

As the user C1 performs the above check-in process using the boarding reception device 10, the control unit 310 receives user-related information including the user data (such as the name of the user C1 and the passport number), user image 322, boarding pass ID, baggage image 324, and baggage ID from the boarding reception device 10. In this case, the control unit 310 generates passenger data 320a related to the user C1 in the database 314. At this point, the boarding record is associated with "not yet," which indicates that the passenger has not yet boarded (see FIG. 13).

Then, as the user C1 performs ticket check, security check, and the like at the security gate 60, the control unit 310 receives area information indicating the area A1, time information indicating the time at which the user C1 stays in front of the security gate 60, and a part of the passenger data (for example, boarding pass ID) from the terminal device 80. In this case, the control unit 310 adds information indicating that the user C1 has stayed in the area A1 and information indicating the latest stay time ("9:05") to the passenger data 320a in the database 314.

Then, as the user C1 moves in the passenger lobby BL and is imaged by the camera 102 of the lobby monitoring device 100 in the passenger lobby BL, the control unit 310 receives area information indicating the installation area of the lobby monitoring device 100, time information indicating the time of this point, and a part of the passenger data (for example, boarding pass ID) from the lobby monitoring device 100. In this case, the control unit 310 adds information indicating that the user C1 has stayed in the area (for example, the A2) and information indicating the latest stay time ("9:10") to the passenger data 320a in the database 314. Furthermore, the control unit 310 identifies an estimated stay area (for example, "A4 to A5") of the user C1 based on the information of the area corresponding to the latest stay time. The control unit 310 adds information indicating the identified estimated stay area (for example, "A4 to A5") to the passenger data 320a.

Then, as the user C1 arrives at the boarding gate 110 for boarding the scheduled boarding plane PD, the control unit 310 receives area information indicating the area A6, time information indicating the time at which the user C1 stays in front of the boarding gate 110, and a part of the passenger data (for example, boarding pass ID) from the terminal device 130. In this case, the control unit 310 adds information indicating that the user C1 has stayed in the area A6 and information indicating the latest stay time to the passenger data 320a in the database 314. The control unit 310 further adds information indicating that the user C1 has boarded the passenger data 320a. Specifically, the description "boarded," which indicates that the passenger has boarded, is added to the boarding record.

On the other hand, the baggage B1 that has been checked-in using the boarding reception device 10 is transported to the loading position. The baggage B1 arrived at the loading position is transported by the transport device toward the scheduled boarding plane PD. While the baggage B1 is transported, RFID wireless communication is performed between the RF tag 52 of the baggage tag 50 attached to the baggage B1 and the RF reader/writer unit 178 of the loading reception device 170. As a result, the control unit 310 receives the tag information (that is, baggage ID, boarding pass ID, and at least part of the user data), and the loading position-related information from the loading reception device 170. In this case, the control unit 310 adds information indicating that the baggage B1 of the user C1 has been loaded in the area A12 (see FIG. 11) of the scheduled boarding plane PD to the passenger data 320a in the database 314.

When the user C1 does not arrive at the boarding gate 110 until near the departure time, the control unit 310 can receive a call signal for calling the user C1 (that is, the unboarded passenger) from the terminal device 130. On receiving the call signal, the control unit 310 refers to the database 314 and identifies the passenger data 230a corresponding to a part of the passenger data of the user C1 included in the call signal (for example, boarding pass ID). Then, the control unit 310 generates a call instruction including a part of the passenger data 230a (specifically, name, flight number and destination, seat class, seat number, departure time, boarding gate, estimated stay area, and user image 322), and transmits the call instruction to the staff's terminal 150. At this point in the process, the control unit 310 may transmit a call instruction while specifying the staff's terminal 150 located near the estimated stay area of the unboarded passenger to be called as a transmission destination. As a result, the call screen 400 (see FIG. 8) for calling the user C1 is displayed on the display unit 152 of the staff's terminal 150 when it receives the call instruction.

Further, when the user C1 is considered to be unlikely to arrive at the boarding gate 110 by the departure time, the control unit 310 can receive a baggage removal signal from the terminal device 130 for removing the baggage B1 of the user C1 from the scheduled boarding plane PD. On receiving the baggage removal signal, the control unit 310 identifies the passenger data 230a corresponding to a part of the passenger data of the user C1 included in the baggage removal signal (for example, baggage ID). Then, the control unit 310 generates a baggage removal instruction including a part of the passenger data 230a (specifically, name, flight number and destination, baggage ID, baggage image 324, and loading position-related information), and transmits the baggage removal instruction to the staff's terminal 150. As a result, the baggage removal screen 500 (see FIG. 11) for removing the baggage B1 is displayed on the display unit 192 of the operator terminal 190 when it receives the baggage removal instruction.

Figure 14:
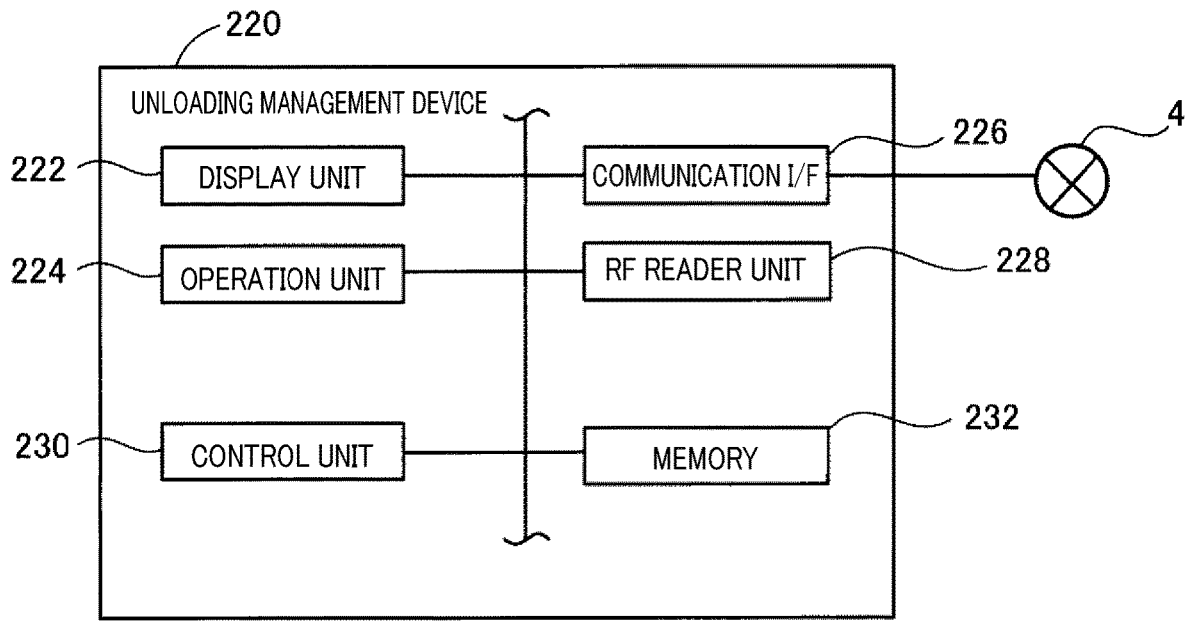
FIG. 14 is a block diagram illustrating a configuration of an unloading management device 220.

Unloading Management Device 220; FIG. 2 and FIG. 14

As shown in FIG. 2, the unloading management device 220 is a stationary device installed at an unloading position where the baggage is unloaded from the arrival plane PA that has arrived at the arrival airport (that is, the same aircraft as the scheduled boarding plane PD in FIG. 1). The unloading management device 220 is a device for reading tag information recorded in the RF tag 52 of baggage tag 50 attached to each baggage item (that is, baggage image, baggage ID, boarding pass ID, and at least part of the user data), and notifying a scheduled time at which the baggage item arrives near the turntable TT (that is, near the user who is the owner of the baggage).

As shown in FIG. 14, the unloading management device 220 includes a display unit 222, an operation unit 224, a communication I/F 226, an RF reader unit 228, a control unit 230, and a memory 232.

The display unit 222 is configured to display various information. The operation unit 224 includes a plurality of keys. An operator (not shown) who performs an unloading operation can input various instructions to the unloading management device 220 by operating the operation unit 224. Further, the display unit 222 according to the present embodiment is configured as a touch panel so that it can also function as an operation unit. The communication I/F 226 is connected to the network 4.

The RF reader unit 228 is a device that can perform RFID wireless communication with the RF tag 52 of the baggage tag 50. The RF reader unit 228 performs wireless communication with the RF tag 52 located within a communication range to read tag information recorded in the RF tag 52 (that is, baggage image, baggage ID, boarding pass ID, at least part of the user data, and the like). In the present embodiment, the RF reader unit 228 does not have a function as a writer that records information in the RF tag 52. However, in modifications, the RF reader unit 228 may have a function as a writer.

The control unit 230, which is provided with a CPU (not shown), is configured to execute various processes according to programs stored in the memory 232. The memory 232 is configured with a RAM, a ROM, or the like, and stores programs for the control unit 230 to execute various processes. Further, the memory 232 includes a storage area for storing various information that is obtained and generated when the control unit 230 executes various processes.

While the unloading management device 220 is ON, the control unit 230 causes the RF reader unit 228 to continuously output a radio wave toward the communication range. As the baggage B1 (baggage of the user C1) that has been transported by the transport device reaches the communication range, the RF tag 52 of the baggage tag 50 attached to the baggage B1 receives the radio wave outputted from the RF reader unit 228 and start RFID wireless communication with the RF reader unit 228. The control unit 230 causes the RF reader unit 228 to read tag information recorded in the RF tag 52 (that is, baggage image, baggage ID, boarding pass ID, at least part of the user data, and the like). The control unit 230 transmits a notification signal including the read tag information to the server 300 via the communication I/F 226. In this case, as will be described later in detail, the server 300 in the arrival airport transmits an arrival schedule signal via the network 4 to the user terminal 260 carried by the user C1 who stays in the arrival airport. On receiving the arrival schedule signal, the user terminal 260 performs a notification operation including displaying of a notification screen (see reference numeral 600 in FIG. 16).

Then, the baggage B1 is further transported by the transport device, and loaded onto the turntable TT. The user C1 who is waiting near the turntable TT can receive his/her own baggage B1 that has been transported on the turntable TT.

Figure 15:
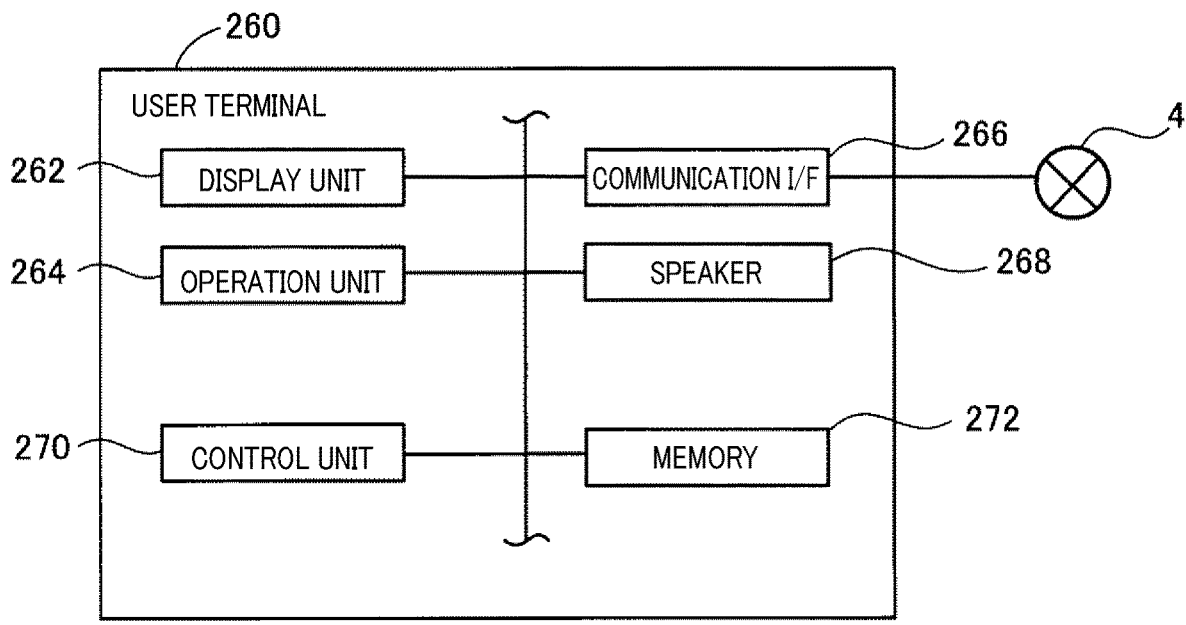
FIG. 15 is a block diagram illustrating a configuration of a user terminal 260.
Figure 16:
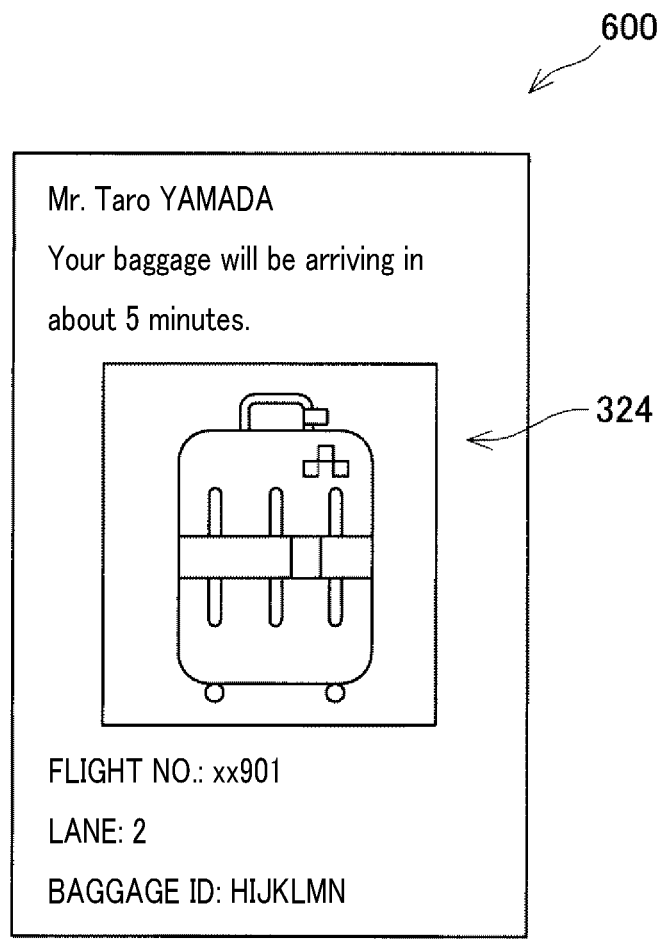
FIG. 16 is a diagram illustrating an example notification screen 600 displayed on a user terminal 260.

User Terminal 260; FIG. 2, FIG. 15, and FIG. 16

As shown in FIG. 2, the user terminal 260 is a terminal device carried by a user (for example, reference numeral C1 in the figure) who is waiting near the turntable TT provided in the arrival lobby. The user terminal 260 may be a smartphone, a mobile phone, a tablet, or the like. The contact information (for example, email address) of the user terminal 260 is inputted by the user during the check-in process using the boarding reception device 10, and added to the passenger data 230a (see "xx@yyy.com" in FIG. 13).

As shown in FIG. 15, the user terminal 260 includes a display unit 262, an operation unit 264, a communication I/F 266, a speaker 268, a control unit 270, and a memory 272.

The display unit 262 is configured to display various information. The operation unit 264 includes a plurality of keys. Further, the display unit 262 according to the present embodiment is configured as a touch panel so that it can also function as an operation unit. The communication I/F 266 is connected to the network 4. The speaker 268 is an output unit for outputting sound.

The control unit 270, which is provided with a CPU (not shown), is configured to execute various processes according to programs stored in the memory 272. The memory 272 is configured with a RAM, a ROM, or the like, and stores programs for the control unit 270 to execute various processes. Further, the memory 272 includes a storage area for storing various information that is obtained and generated when the control unit 270 executes various processes.

According to the present embodiment, the control unit 270 of the user terminal 260 receives an arrival schedule signal for notifying the arrival schedule of the baggage B1 of the user C1 from the server 300 via the communication I/F 266. In this case, the control unit 270 performs a notification operation. Specifically, the control unit 270 causes the display unit 262 to display the notification screen (see FIG. 16) based on a part of the passenger data included in the arrival schedule signal. Further, the control unit 270 causes the speaker 268 to output a predetermined notification sound.

FIG. 16 is an example notification screen 600 displayed on the display unit 262 when the arrival schedule signal for notifying the arrival schedule of the baggage B1 of the user C1 is received. As shown in FIG. 16, the notification screen 600 includes a message notifying the user C1 of a scheduled time at which the baggage arrives (for example, "in about 5 minutes"), flight number, baggage ID, baggage image 324, and the like. The user C1, when viewing the notification screen 600, can recognize that his/her own baggage B1 is scheduled to arrive at the turntable TT in about 5 minutes.

Processes Performed by Control Unit 310 of Server 300 at Arrival Airport

Processes performed by the control unit 310 of the server 300 at the arrival airport will now be described.

As the baggage B1 is unloaded from the arrival plane PA, the baggage B1 is transported by the transport device toward the turntable TT. While the baggage B1 is transported, RFID wireless communication is performed between the RF tag 52 of the baggage tag 50 attached to the baggage B1 and the RF reader unit 228 of the unloading management device 220. As a result, the control unit 310 receives the notification signal including the tag information (that is, baggage image, baggage ID, boarding pass ID, at least part of the user data, and the like) from the unloading management device 220.

On receiving the notification signal, the control unit 310 refers to the database 314 and identifies the passenger data 230a corresponding to a part of the tag information of the user C1 included in the notification signal (for example, baggage ID). Then, the control unit 310 generates an arrival schedule signal including a part of the passenger data 230a (specifically, name, flight number and destination, baggage ID, and baggage image 324), and transmits the arrival schedule signal to a transmission destination described in the contact information included in the passenger data 230a (that is, contact information of the user terminal 260 carried by the user C1).

As a result, the user terminal 260 receives the arrival schedule signal. The user terminal 260 performs the notification operation including displaying of the notification screen 600 (see FIG. 16), outputting notification sound, and the like.

Advantageous Effects

In the above description, the configuration of the airport management system 2 of the present embodiment and the processes executed by the control unit of the respective devices have been described. As described above, in the present embodiment, the loading reception device 170 performs RFID wireless communication with the RF tag 52 of the baggage tag 50 attached to the baggage B1 that has arrived at the loading position to read the tag information, and transmits the tag information and the loading position-related information to the server 300. Therefore, the loading reception device 170 can read the tag information as long as it can perform wireless communication with the RF tag 52 attached to the baggage B1 regardless of which direction the baggage B1 that has arrived at the loading position is oriented. Accordingly, the burden on the operator ST4 can be reduced compared with a conventional configuration in which an operator at the loading position reads baggage information recorded in the information code displayed on the baggage tag attached to the baggage by using an information code reader. Further, the server 300 can associate user data including the user name with the loading position-related information and store the associated user data and loading position-related information in the database 314. That is, the server 300 can appropriately manage the loading position of the baggage B1. Therefore, according to the present embodiment, since the baggage B1 can be appropriately managed and the burden on the operator ST4 can be reduced, it is possible to prevent occurrence of delay in the departure time of the scheduled boarding plane PD.

As described above, in the present embodiment, the control unit 200 of the operator terminal 190 receives a baggage removal instruction for removing the baggage of an unboarded passenger from the server 300 via the communication I/F 156. Then, the control unit 200 causes the display unit 192 to display the baggage removal screen (see FIG. 11) based on a part of the passenger data included in the baggage removal instruction. When viewing the baggage removal screen 500, the operator ST4 can recognize that the baggage B1 should be searched for and quickly removed from the scheduled boarding plane PD, and also recognize the appearance of the baggage B1 and the loading position of the baggage B1. While referring to the information displayed on the baggage removal screen 500, the operator ST4 can search for the baggage B1 and remove the baggage B1 from the scheduled boarding plane PD. This can reduce the burden on the operator ST4 in baggage removal operation of the baggage of the unboarded passenger. Therefore, with this configuration, it is possible to further prevent occurrence of delay in the departure time of the scheduled boarding plane PD.

As described above, in the present embodiment, when searching for the baggage B1 to be removed, the operator ST4 can operate, for example, the operation unit 194 to input a predetermined searching operation while specifying a desired baggage ID (for example, the baggage ID of the baggage B1). In this case, the control unit 200 causes the RF reader unit 198 to output a radio wave and transmit a search signal including the specified baggage ID toward the communication range. When the RF tag 52 in which the specified baggage ID is recorded receives the search signal, the RF tag 52 transmits the recorded tag information (that is, baggage ID, boarding pass ID, at least part of the user data, and loading position-related information recorded by the loading reception device 170) to the operator terminal 190. That is, RFID wireless communication is performed between the RF reader unit 198 and the RF tag 52. Thus, the control unit 200 can obtain the tag information via the RF reader unit 198. The control unit 200 can display information indicating the loading position of the baggage B1 provided by the loading position-related information and the map 510 illustrating the loading position based on the loading position-related information included in the obtained tag information. That is, in the present embodiment, when searching for the baggage B1, the operator ST4 can cause the RF reader unit 198 and the RF tag 52 to perform wireless communication with each other to thereby obtain the loading position-related information from the RF tag 52, and display the position of the baggage B1 in the baggage removal screen 500 based on the obtained loading position-related information. Even when the operator terminal 190 does not receive a baggage removal instruction from the server 300, the operator terminal 190 can display the baggage removal screen 500 indicating the position of the desired baggage (for example, baggage B1). When viewing information indicating the position of the baggage of the unboarded passenger displayed on the display unit 192 of the operator terminal 190, the operator ST4 can easily recognize the position of the desired baggage. That is, this can reduce the burden on the operator ST4 in baggage removal operation of the baggage of the unboarded passenger. Therefore, with this configuration, it is possible to further prevent occurrence of delay in the departure time of the scheduled boarding plane PD.

Moreover, in the present embodiment, the baggage removal screen (see FIG. 11) displays the baggage image 324 captured by the boarding reception device 10 in addition to the information indicating the position of the baggage B1. When viewing the display unit 192 of the operator terminal 190, the operator ST4 can recognize the appearance of the baggage B1 in addition to the position of the baggage B1 to be removed (for example, baggage of the unboarded passenger). The operator ST4 can easily find the baggage B1 to be removed. Therefore, with this configuration, it is possible to reduce the burden on the operator ST4 in baggage removal operation of the baggage B1 of the unboarded passenger, and further prevent occurrence of delay in the departure time of the scheduled boarding plane PD.

Moreover, in the present embodiment, the security gate 60, the terminal device 80, a plurality of lobby monitoring devices 100, the boarding gate 110, and the terminal device 130 are provided in the passenger lobby BL. The boarding reception device 10 captures an image of the user to obtain a user image. When an image of a person captured by each of the security gate 60, the terminal device 80, a plurality of lobby monitoring devices 100, the boarding gate 110, and the terminal device 130 matches the user image, the area information, the time information, and a part of the passenger data (for example, boarding pass ID) are transmitted to the server 300. Accordingly, the control unit 310 of the server 300 identifies an estimated stay area of the user C1 based on the information of the area corresponding to the latest stay time. The control unit 310 adds information indicating the identified estimated stay area (for example, "A4 to A5") to the passenger data 320a (see FIG. 13). When viewing the passenger data of each user, the boarding staff member ST3 who uses the terminal device 130 or an administrator of the server 300 can recognize the time and position in the passenger lobby BL where the user has arrived. Therefore, the boarding staff member ST3 or the administrator of the server 300 can identify the unboarded passenger who has not arrived at the boarding gate 110 by a predetermined time, and also recognize the area in the passenger lobby BL where the unboarded passenger stays. It is thus possible to identify and search for the unboarded passenger with improved efficiency, and further effectively prevent occurrence of delay in the departure time of the scheduled boarding plane PD.

Moreover, in the present embodiment, as the server 300 transmits a call instruction including at least the user ID and the user image from among the passenger data of the unboarded passenger to the staff's terminal 150, a call screen (see FIG. 8) including the user image and information such as the user name of the unboarded passenger can be displayed on the display unit 152 of the staff's terminal 150. The lobby staff member ST2, when viewing the call screen, can recognize that the unboarded passenger should be searched for and quickly guided to the boarding gate 110, and also recognize the face of the unboarded passenger. While referring to the information displayed on the call screen, the lobby staff member ST2 can search for the unboarded passenger and guide the unboarded passenger to the boarding gate 110. Therefore, according to the present embodiment, it is possible to improve efficiency in searching for a desired user including an unboarded passenger, and effectively prevent occurrence of delay in the departure time of the scheduled boarding plane PD. In addition, the server 300 can transmit a call instruction while specifying the staff's terminal 150 located near the estimated stay area of the unboarded passenger to be called as a transmission destination. In this case, an appropriate lobby staff member ST2 among a plurality of lobby staff members ST2 can call the unboarded passenger.

Moreover, in the present embodiment, the call screen 400 (see FIG. 8) displayed on the display unit 152 of the staff's terminal 150 displays information indicating the estimated stay area of the unboarded passenger and the map 410. When viewing the call screen, the lobby staff member ST2 can recognize the area in which the unboarded passenger to be searched for is highly likely to stay. It is thus possible to improve efficiency in searching for a desired user including an unboarded passenger, and effectively prevent occurrence of delay in the departure time of the scheduled boarding plane PD.

Moreover, in the present embodiment, the unloading management device 220 at the arrival airport performs RFID wireless communication with the RF tag 52 of the baggage B1 that has been unloaded from the arrival plane PA to read the tag information, and transmits a notification signal including the read tag information to the server 300. The server 300 transmits an arrival schedule signal via the network 4 to the user terminal 260 carried by the user C1 who stays in the arrival airport. Then, the user terminal 260 performs a notification operation including displaying of a notification screen (see reference numeral 600 in FIG. 16). Thus, according to the present embodiment, as the user terminal 260 performs the notification operation, the user C1 can recognize the time required for his/her own baggage B1 to arrive near the user C1 (that is, turntable TT) at the arrival airport. Therefore, since the user can predict the time at which his/her own baggage B1 arrives near the user, the user can receive his/her own baggage B1 at an appropriate timing.

Correspondence Relationship

The following description will be given of the correspondence relationship between the present embodiment and claims. The airport management system 2 is an example of a "system including an airline baggage management system constructed as a baggage management system." The user data (that is, various information such as the name of the user C1, passport number, contact information, and the like) is an example of a "user ID." The passenger data is an example of "user-related information." The area information is an example of "positional information." The estimated stay area is an example of a "specific range." The RF reader/writer unit 178 of FIG. 9 is an example of a "loading reader unit" and a "loading writer unit." The RF reader 198 of FIG. 10 is an example of an "operator terminal reader unit." The display unit 192 of FIG. 10 is an example of an "operator terminal display unit." The first camera 20 of FIG. 3 is an example of a "user image obtaining unit," and the second camera 30 is an example of a "baggage image obtaining unit." The security gate 60, the terminal device 80, the plurality of lobby monitoring devices 100, the boarding gate 110, and the terminal device 130 are examples of a "monitoring device." The display unit 152 of FIG. 7 is an example of a "staff terminal display unit." The RF reader unit 228 of FIG. 14 is an example of an "unloading reader unit." The display unit 262 and the speaker 268 of FIG. 15 are examples of a "notification unit."

Second Embodiment

An airport management system 2 of the second embodiment will be described below, focusing on differences from the first embodiment. The configuration of the airport management system 2 of the second embodiment is basically the same as that of the first embodiment. In the above first embodiment, the first camera 20 of the boarding reception device 10, the camera 62 of the security gate 60, the camera 112 of the boarding gate 110, and the like capture an image of a range including the face of the user C1 to obtain a user image, which is an image centered on the face of the user C1. On the other hand, in the present embodiment, the first camera 20 of the boarding reception device 10, the camera 62 of the security gate 60, the camera 112 of the boarding gate 110, and the like capture an image of the entire appearance (entire body) of the user C1, not just the face of the user C1, to obtain a user image, which is an image showing the appearance of the user C1. That is, in the present embodiment, the user image is an image showing the body shape, hairstyle, clothes, physique, and the like of the user C1, not just the face of the user C1.

Therefore, in the present embodiment, the control unit 90 of the terminal device 80 compares the user image obtained from the security gate 60 with the user image included in the passenger data by comparing the feature points of the entire appearance of the user between both images. The same applies to the case where the control unit 140 of the terminal device 130 compares the user image obtained from the boarding gate 110 with the user image included in the passenger data.

Further, when an image of the user is included in the image captured by the camera 102, the control unit 106 of the lobby monitoring device 100 extracts feature points of the appearance from the image of the user. Simultaneously, the control unit 106 accesses the database 314 of the server 300, and identifies the passenger data including the user image having the feature points common to the extracted feature points.

The above description has been given of the present embodiment. As described above, in the present embodiment, the user image is an image showing the appearance (body shape, hairstyle, clothes, physique, and the like) of the user C1. According to the present embodiment, the user C1 can be identified based on, not only the face, but also various features including body shape, hairstyle, clothes, physique, and the like.

Third Embodiment

An airport management system 2 of the third embodiment will be described focusing on differences from the first embodiment. The configuration of the airport management system 2 of the third embodiment is basically the same as that of the first embodiment. As described above, in the first embodiment, the scan unit 22 of the boarding reception device 10 scans a passport to obtain a scan image. Then, the control unit 40 extracts a photograph image of the user C1 and character information such as name and passport number from the scan image of the passport.

In addition, the present embodiment differs from the first embodiment in that a passport includes an information code (specifically, a two-dimensional code), in which the feature point data representing the feature points of the face of the user C1 is recorded. In the present embodiment as well, the scan unit 22 of the boarding reception device 10 scans a passport to obtain a scan image. Then, the control unit 40 extracts a photograph image of the user C1 and character information such as name and passport number from the scan image of the passport. Further, the control unit 40 decodes the information code based on the image of the information code included in the scan image of the passport to obtain feature point data recorded in the information code. The feature point data is included in the user-related information, which is transmitted by the control unit 40 to the server 300. The user-related information including the feature point data is recorded in the database 314 of the server 300.

Further, in the present embodiment, when an image of the user is included in the image captured by the camera 102, the control unit 106 of the lobby monitoring device 100 extracts feature points of the appearance from the image of the user. Simultaneously, the control unit 106 accesses the database 314 of the server 300, and identifies the feature point data representing the feature points common to the extracted feature points to thereby identify the passenger data of the same person as the user present in the image captured by the camera 102. In this case, the control unit 106 associates the area information indicating the area where it is installed, time information indicating the time of this point, and a part of the identified passenger data to each other, and transmits these to the server 300 via the communication I/F 104 and the network 4. Thus, information indicating that the user has stayed in the installation area and information indicating the latest stay time are added to the passenger data related to the user in the database 314 of the server 300.

As described above, in the present embodiment, the user-related information includes the feature point data. In general, the data volume of the feature point data is smaller than that of the facial image itself obtained by capturing an image of the face of the user. Therefore, the processing load of the server 300 that stores the user-related information can be reduced. In addition, when the lobby monitoring device 100 determines whether or not the image captured by the camera 102 includes a specific image, which is an image of the same person as the user C1 represented by the feature point data, the feature point data representing the feature points extracted in advance based on the face of the user can be used. In this case, the processing load of the lobby monitoring device 100 can be reduced compared with the case where the determination is performed by comparing the facial image of the user C1 captured in advance with the image captured by the camera 102. Further, the determination result can be obtained quickly compared with the determination result of whether or not the image captured by the camera 102 includes the user C1. As described above, in the present embodiment, the processing load of the respective devices can be reduced by the use of the feature point data. Furthermore, from the viewpoint of personal information protection as well, the personal information is desirably owned and managed by the user himself/herself. In the present embodiment, a passport is an example of a "recording medium."

The details of the embodiments have been described above. However, they are merely examples and do not limit the scope of the claims. Various modifications and alterations to the above specific examples should be within the scope of techniques disclosed in the claims. For example, the following modifications may be adopted.

Modification 1) In the above embodiments, a call instruction is transmitted to the staff's terminal 150 from the server 300 in response to a call signal being transmitted to the server 300 from the terminal device 130 according to the instruction from the boarding staff member ST3. In a modification, instead of a call signal being transmitted to the server 300 from the terminal device 130, a call signal may be transmitted to the staff's terminal 150 by the control unit 310 of the server 300 according to the instruction from the administrator of the server 300. In this modification, the control unit 310 is an example of a "call instruction transmission unit."

(Modification 2) In the above embodiments, a baggage removal instruction is transmitted to the operator terminal 190 from the server 300 in response to a baggage removal signal being transmitted to the server 300 from the terminal device 130 according to the instruction from the boarding staff member ST3. In a modification, instead of a baggage removal signal being transmitted to the server 300 from the terminal device 130, a baggage removal signal may be transmitted to the operator terminal 190 by the control unit 310 of the server 300 according to the instruction from the administrator of the server 300. In this modification, the control unit 310 is an example of a "baggage removal instruction transmission unit."

(Modification 3) In the above embodiments, each of the security gate 60, the terminal device 80, a plurality of lobby monitoring devices 100, the boarding gate 110, and the terminal device 130 monitors that images captured by the cameras 62, 102, and 112 include an image of the same person as the user displayed in the user image of the passenger data stored in the database 314. Instead of the above configuration, the control unit 310 of the server 300 may monitor, via each of the security gate 60, the terminal device 80, a plurality of lobby monitoring devices 100, the boarding gate 110, and the terminal device 130, that images captured by the cameras 62, 102, and 112 include an image of the same person as the user displayed in the user image of the passenger data stored in the database 314. In this case, each of the security gate 60, the terminal device 80, the plurality of lobby monitoring devices 100, the boarding gate 110, and the terminal device 130 may transmit images captured by the cameras 62, 102, and 112 to the server 300. In this modification, the security gate 60, the terminal device 80, the plurality of lobby monitoring devices 100, the boarding gate 110, the terminal device 130, and the control unit 310 of the server 300 are examples of a "monitoring device."

(Modification 4) In the above embodiments, the database 314 is provided in the memory 312 of the server 300 (see FIG. 12). Instead of the above configuration, the database 314 may be provided outside the server 300. In this case, each device may be configured as accessible to the database 314 via the network 4.

(Modification 5) In the above embodiments, the second camera 30 of the boarding reception device 10 captures an image of the baggage B1 at a single angle only, and obtains only one image of the baggage. Instead of the above configuration, in a modification, the second camera 30 may capture images of the baggage B1 in three directions so that three images of the baggage at different angles can be obtained.

(Modification 6) In the above embodiments, the operator ST4 carrying the operator terminal 190 performs baggage removal of the baggage of the unboarded passenger according to the baggage removal instruction. After removing the baggage B1 from the scheduled boarding plane PD, the operator ST4 operates the operation unit 194 of the operator terminal 190 to perform a predetermined completion operation. As the completion operation is performed, the control unit 200 of the operator terminal 190 transmits a predetermined baggage removal completion notification to the server 300. In a modification, at this point in the process, the control unit 310 of the server 300 may delete the passenger data corresponding to the baggage removal completion notification (that is, the passenger data of the unboarded passenger) from the database 314.

(Modification 7) In the examples described in the above embodiments and modifications thereof, the baggage management system is provided in an airport (departure facility and arrival facility). However, it may be provided in any facility at which passengers may check-in their baggage before boarding a vehicle. For example, large marine terminals such as cruise ship terminals, bus terminals, and the like are also possible.

Further, the technical elements described in the specification or the drawings may be used singly or in various combinations to achieve technical advantages, and should not be limited to the combinations described in the claims at the time of filing. Further, the techniques illustrated in the specification or the drawings should achieve a plurality of objects simultaneously, and achieving one of the objects should have a technical advantage.

REFERENCE SIGNS LIST

2: Airport management system (which functions as an airline baggage management system (baggage management system))
2*a*: Departure airport system
2*b*: Arrival airport system
4: Network
10: Boarding reception device
12: Display unit
14: Operation unit
16: Information code reading unit 18: IC chip reading unit
20: First camera
22: Scan unit
24: Boarding pass output unit
26: Communication I/F
30: Second camera
32: Baggage tag output unit
34: Receiving unit
40: Control unit
42: Memory
50: Baggage tag
52: RF tag
60: Security gate
62: Camera
64: Information code reading unit
66: IC chip reading unit
68: Scan unit
69: Communication I/F
70: Control unit
72: memory
80: Terminal device
82: Display unit
84: Operation unit
86: Communication I/F
90: Control unit
92: Memory
100: Lobby monitoring device
102: Camera
104: Communication I/F
106: Control unit
108: Memory
110: Boarding gate
112: Camera
114: Information code reading unit
116: IC chip reading unit
118: Scan unit
119: Communication I/F
120: Control unit
122: Memory
130: Terminal device
132: Display unit
134: Operation unit
136: Communication I/F
140: Control unit
142: Memory
150: Staff's terminal
152: Display unit
154: Operation unit
156: Communication I/F
160: Control unit
162: Memory
170: Loading reception device
172: Display unit
174: Operation unit
176: Communication I/F
178: RF reader/writer unit
180: Control unit
182: Memory
190: Operator terminal
192: Display unit
194: Operation unit
196: Communication I/F
198: RF reader unit
200: Control unit
202: Memory
220: Unloading management device
222: Display unit
224: Operation unit
226: Communication I/F
228: RF reader unit
230: Control unit
230a: Passenger data
232: Memory
260: User terminal
262: Display unit
264: Operation unit
266: Communication I/F
268: Speaker
270: Control unit
272: Memory
300: Server
302: Display unit
304: Operation unit
306: Communication I/F
310: Control unit
312: Memory
314: Database
320a: Passenger data
320b: Passenger data
320c: Passenger data
322: User image
324: Baggage image
400: Call screen
410: Map
500: Screen
510: Map
600: Notification screen
B1 to B3: Baggage
BL: Passenger lobby
C1: User
PD: Scheduled boarding plane
PA: Arrival plane
ST1: Security staff member
ST2: Lobby staff member
ST3: Boarding staff member
ST4: Operator
TT: Turntable

The invention claimed is:
1. A baggage management system comprising:
a boarding reception device whereby a user performs a procedure required to board a scheduled boarding plane at a departure airport;
a loading reception device provided at a loading position where baggage checked-in by the user is loaded onto the scheduled boarding plane at the departure airport;
an operator terminal carried by an operator working at the loading position; and
a server configured to communicate with the boarding reception device, the loading reception device, and the operator terminal,
the boarding reception device comprising:
a tag output unit configured to output a baggage tag provided with an RF tag in which tag information is recorded, the tag information including at least one of a user ID for identifying the user, a boarding pass ID assigned to the user and related to the scheduled boarding plane, and a baggage ID for identifying the baggage checked-in by the user;
a receiving unit configured to receive the baggage with the outputted baggage tag being attached thereto, and transport the received baggage to the loading position; and an information transmission unit configured to transmit user-related information including the tag information to the server, the server comprising:
- a memory;
- a server reception unit configured to receive the user-related information from the boarding reception device; and
- a storage control unit configured to store the user-related information received from the boarding reception device in the memory, and the loading reception device comprising:
- a loading reader unit configured to perform wireless communication with the RF tag of the baggage tag attached to the baggage that has arrived at the loading position to thereby read the tag information recorded in the RF tag;
- an information generating unit configured to generate loading position-related information, which is related to a position in the scheduled boarding plane at which the baggage whose tag information has been read by the loading reader unit is to be loaded;
- a loading transmission unit configured to transmit the tag information and the loading position-related information to the server; and
- a baggage removal instruction transmission unit configured to transmit, with the operator terminal, a baggage removal instruction including at least part of the user-related information and the loading position-related information associated with the user-related information to the operator terminal, wherein the server reception unit is further configured to receive the tag information and the loading position-related information from the loading reception device, the storage control unit is further configured to identify the user-related information in the memory including information that matches at least one of the user ID, the boarding pass ID, and the baggage ID included in the tag information received from the loading reception device, and associates the identified user-related information with the loading position-related information received from the loading reception device and stores the associated user-related information and loading position-related information in the memory, and the operator terminal comprises:
- an operator terminal display unit;
- a baggage removal instruction reception unit configured to receive the baggage removal instruction from the server; and
- a second display control unit configured to cause the operator terminal display unit to display information indicating a position of the baggage based on at least part of the user-related information included in the baggage removal instruction and the loading position-related information.

2. The baggage management system according to claim 1, wherein
the boarding reception device further includes a baggage image obtaining unit configured to capture an image of the baggage to obtain a baggage image,
the user-related information includes the baggage image in addition to the tag information,
at least part of the user-related information included in the baggage removal instruction includes the baggage image, and
the second display control unit is configured to cause the operator terminal display unit to display the baggage image together with the information indicating the position of the baggage.

* * * * *